(12) United States Patent
Jibiki et al.

(10) Patent No.: US 8,632,258 B2
(45) Date of Patent: Jan. 21, 2014

(54) OPTICAL CONNECTOR ADAPTER WITH SHUTTER

(75) Inventors: Masayuki Jibiki, Chiba (JP); Junji Taira, Chiba (JP)

(73) Assignee: Seikoh Giken Co., Ltd., Chiba (JP)

( * ) Notice: Subject to any disclaimer, the term of this patent is extended or adjusted under 35 U.S.C. 154(b) by 286 days.

(21) Appl. No.: 13/191,541

(22) Filed: Jul. 27, 2011

(65) Prior Publication Data
US 2012/0033918 A1    Feb. 9, 2012

(30) Foreign Application Priority Data
Aug. 3, 2010    (JP) .................................. 2010-174374

(51) Int. Cl.
*G02B 6/38*    (2006.01)
(52) U.S. Cl.
USPC .................................. 385/75; 385/72; 385/78
(58) Field of Classification Search
USPC .................... 385/53, 70, 72, 75, 78
See application file for complete search history.

(56) References Cited

U.S. PATENT DOCUMENTS

| | | | | |
|---|---|---|---|---|
| 5,506,922 A * | 4/1996 | Grois et al. | ...................... | 385/75 |
| 6,461,054 B1 * | 10/2002 | Iwase | ............................... | 385/73 |
| 7,507,032 B2 * | 3/2009 | Katagiyama et al. | ........... | 385/73 |
| 7,534,115 B2 * | 5/2009 | Murano et al. | ................ | 439/138 |
| 7,837,395 B2 * | 11/2010 | Lin et al. | .......................... | 385/58 |
| 8,186,890 B2 * | 5/2012 | Lu | .................................... | 385/60 |
| 2007/0098330 A1 * | 5/2007 | Ozawa et al. | ................... | 385/76 |
| 2012/0195555 A1 * | 8/2012 | Jibiki et al. | ..................... | 385/75 |

FOREIGN PATENT DOCUMENTS

JP    2002-243978    8/2002

* cited by examiner

*Primary Examiner* — Daniel Petkovsek
(74) *Attorney, Agent, or Firm* — Clark & Brody

(57) ABSTRACT

An optical connector adapter allowing a stopper member to be arranged at ends of an insertion hole while being overlaid on a shutter member is provided.

In the optical connector adapter, a first base plate of the shutter member is fitted into a bottom wall recess, a second base plate of the stopper member is fitted into the bottom wall recess while being overlaid on the first base plate of the shutter member, first both side plates of the shutter member are fitted into a sidewall recess, and the second both side plates of the stopper member are fitted into the sidewall recess while being overlaid on the first both side plates of the shutter member.

20 Claims, 20 Drawing Sheets

OPTICAL CONNECTOR ADAPTER WITH SHUTTER

BACKGROUND OF THE INVENTION

1. Field of the Invention

The present invention relates to an optical connector adapter that connects optical connector plugs or an optical connector plug and an optical oscillating apparatus such as a semiconductor laser.

2. Description of the Related Art

In optical communication in which laser light oscillated from an optical oscillating apparatus such as a semiconductor laser is transmitted by using an optical fiber, an optical connector adapter that allows an optical connector plug to be removably inserted is used as a unit for connecting the optical fiber. If removal work of the optical connector plug inserted into the adapter is done while laser light being oscillated from the optical oscillating apparatus, there is a danger that eyes of an operator may be exposed to laser light leaked out from the adapter.

To avoid such a danger, an optical connector adapter including a housing formed of top/bottom walls and both sidewalls, an insertion hole cutting through the housing in a front-back direction through which an optical connector plug is removably inserted, an optical connection sleeve installed in a center portion of the insertion hole to support a ferrule of the optical connector plug, a shutter member (shutter metal fitting) installed at one end of the insertion hole, and a stopper member (stopper metal fitting) installed at the other end of the insertion hole is known (see Japanese Patent Application Laid-Open No. 2002-243978 (JP. A)).

The shutter member is formed of a base plate, both side plates extending upward from both side edges of the base plate, and an elastically deformable shutter plate extending obliquely upward from the base plate by being connected to a front edge of the base plate. In the shutter member, the base plate thereof touches the bottom wall of the housing, the both side plates thereof are fitted into sidewall recesses formed in the sidewalls of the housing and the shutter plate thereof is positioned at an end of the insertion hole to shield the end. The stopper member is formed of a base plate, both side plates extending upward from both side edges of the base plate, and an elastically deformable locking plate formed in the both side plates. In the stopper member, the base plate thereof touches the bottom wall of the housing and the both side plates thereof are fitted into sidewall recesses formed in the sidewalls of the housing.

The shutter plate is positioned on the inner side of one end of the insertion hole to shield the insertion hole while inclining toward the center portion of the insertion hole. An adapter can be mounted at a predetermined position of a mounting panel, various apparatuses, and various devices used for optical communication by using the locking plate of the stopper member. If an optical connector plug is inserted into the insertion hole of the adapter, the shutter plate is elastically deformed by being pressed by the optical connector plug and the shutter plate falls toward the center portion of the insertion hole so that shielding of the insertion hole is released. When the optical connector plug is removed from the insertion hole, the shutter plate rises owing to an elastic force (repulsive force) thereof to shield the insertion hole again.

While an optical connector adapter disclosed by Japanese Patent Application Laid-Open No. 2002-243978 (JP. A) can install the shutter member at one end of the insertion hole and the stopper member at the other end of the insertion hole, but it is impossible to install the shutter member at both ends of the insertion hole and at the same time, to install the stopper member at an end of the insertion hole while being overlaid on the shutter member. Thus, laser light can be shielded at one end, but cannot be shielded at the other end and therefore, if removal work of the optical connector plug is done while laser light being oscillated from the optical oscillating apparatus, there still remains a danger that eyes of the operator may be exposed to laser light leaked out from the adapter.

An object of the present invention is to provide an optical connector adapter capable of installing the shutter member at both ends of the insertion hole and at the same time, installing the stopper member at an end of the insertion hole while being overlaid on the shutter member.

SUMMARY OF THE INVENTION

An assumption of the present invention to solve the above problem is an optical connector adapter having top/bottom walls and both sidewalls extending in a front-back direction, an insertion hole surrounded by these walls and cutting through in the front-back direction to allow an optical connector plug to be removably inserted, a shutter member removably installed at both ends of the insertion hole and able to open/close the both ends of the insertion hole, and a sleeve for optical connection installed in a center portion of the insertion hole to support a ferrule of the optical connector plug.

According to an aspect of the present invention under the above assumption, the adapter contains a stopper member removably installed at least at one of the both ends of the insertion hole, the shutter member includes a first base plate, first both side plates extending upward from both side edges of the first base plate, a connecting plate positioned between the first both side plates and extending upward from a front edge of the first base plate, and an elastically deformable shutter plate connected to the connecting plate, extending upward from the first base plate, and curved with a predetermined curvature radius, the stopper member includes a second base plate, second both side plates extending upward from both side edges of the second base plate, and an elastically deformable locking plate formed on the second both side plates, a first bottom wall recess recessed from an external surface of a bottom wall toward an internal surface thereof and a second bottom wall recess positioned on a side of the center portion from the first bottom wall recess, recessed from the external surface toward the internal surface, and having a recess depth shallower than the recess depth of the first bottom wall recess are formed on the external surface of the bottom wall extending to the both ends, a first sidewall recess recessed from the external surface toward the internal surface and a second sidewall recess recessed from the external surface toward the internal surface and having the recess depth shallower than the recess depth of the first sidewall recess are formed on the external surface of the both sidewalls extending to the both ends, the first base plate of the shutter member forms a substantially same plane as the plane of the second bottom wall recess while being fitted into the first bottom wall recess, the second base plate of the stopper member is fitted into the second bottom wall recess while being overlaid on the first base plate, the first both side plates of the shutter member form substantially the same plane as the plane of the second sidewall recess while being fitted into the first sidewall recess, the second both side plates of the stopper member are fitted into the second sidewall recess while being overlaid on the first both side plates, and the shutter plate of the shutter member is positioned at the both ends of the insertion hole to shield the insertion hole while being curved to form a convex shape toward the center portion of the insertion hole and when the optical connector plug is inserted into the insertion hole, falls toward the center portion of the insertion hole by being pressed by the optical connector plug.

As an example of the present invention, an end face recess recessed toward the center portion of the insertion hole is formed on an end face of the bottom wall extending to the both ends and the connecting plate of the shutter member is fitted into the end face recess.

As another example of the present invention, the first base plate of the shutter member is in close contact with the first bottom wall recess, the first both side plates of the shutter member are in close contact with the first sidewall recess, the second base plate of the stopper member is in close contact with the second bottom wall recess and the first base plate of the shutter member, and the second both side plates of the stopper member are in close contact with the second sidewall recess and the both side plates of the shutter member.

As still another example of the present invention, a third bottom wall recess positioned on the side of the both ends from the first bottom wall recess, recessed from the external surface toward the internal surface, and having the recess depth shallower than the recess depth of the second bottom wall recess and a bottom wall step portion connected to the first bottom wall recess and the third bottom wall recess are formed on the external surface of the bottom wall extending to the both ends and the first base plate of the shutter member includes a first fitting portion fitted into the first bottom wall recess, a second fitting portion fitted into the third bottom wall recess, and a step fitting portion positioned between the first fitting portion and the second fitting portion to fit into the bottom wall step portion.

As still another example of the present invention, an accommodation recess that is recessed from the internal surface toward the external surface and accommodates the shutter plate of the shutter member when the shutter plate falls toward the center portion of the insertion hole is formed on the internal surface of the bottom wall extending to the both ends.

As still another example of the present invention, the shutter plate of the shutter member includes a fixed portion positioned at a base end and in close contact with the internal surface of the bottom wall, a bent portion positioned at an extending end thereof and bent at a predetermined angle with respect to the center portion of the insertion hole, and a curved portion positioned between the fixed portion and the bent portion and curved to form a convex shape toward the center portion of the insertion hole.

As still another example of the present invention, in the adapter, the first bottom wall recess is symmetrically formed, the second bottom wall recess is symmetrically formed, the third bottom wall recess is symmetrically formed, the first sidewall recess is symmetrically formed, and the second sidewall recesses are symmetrically formed by sandwiching a center line dividing the adapter in the front-back direction therebetween.

As still another example of the present invention, the adapter contains at least one partition wall positioned between the both sidewalls and extending in the front-back direction and includes at least the two insertion holes arranged in a lateral direction across the partition wall, the shutter member includes at least the two connecting plates and the two shutter plates arranged in the lateral direction while sharing the base plate, and these shutter plates are positioned at the both ends of these insertion holes and curved to form the convex shape toward the center portion of the insertion holes.

As still another example of the present invention, the base plate of the shutter member includes a recess positioned between these shutter plates and recessed toward the center portion of the insertion hole.

As still another example of the present invention, the shutter plate has the curvature radius in a range of 5.0 to 7.5 mm.

As still another example of the present invention, the shutter member has a thickness dimension in a range of 0.01 to 0.1 mm and an elastic/repulsive force in a range of 0.1 to 0.6 N.

According to an optical connector adapter according to the present invention, a first bottom wall recess and a second bottom wall recess are formed in a bottom wall, a first sidewall recess and a second sidewall recess are formed in both sidewalls, a base plate and both side plates of a shutter member are fitted into the first bottom wall recess and the first sidewall recess, a base plate of a stopper member is fitted into the second bottom wall recess while being overlaid on the base plate of the shutter member, and both side plates of the stopper member are fitted into the second sidewall recess while being overlaid on the both side plates of the shutter member and therefore, both the shutter member and the stopper member can be arranged at ends of an insertion hole. The adapter can have the shutter member installed at both ends of the insertion hole and the stopper member installed at least at one of the both ends of the insertion hole and thus, laser light can be shielded at the both ends of the insertion hole and therefore, there is no danger that eyes of an operator may be exposed to laser light leaked out from the adapter even if insertion/removal work of an optical connector plug is done at the both ends of the insertion hole. The shutter member is formed of a first base plate, first both side plates extending upward from both side edges of the first base plate, a connecting plate extending upward from a front edge of the first base plate, and a shutter plate connected to the connecting plate and curved with a predetermined curvature radius and the stopper member is formed of a second base plate, second both side plates extending upward from both side edges of the second base plate, and a locking plate formed on the second both side plates and thus, the shutter member and the stopper member can be mass-produced in a short time by press molding so that the shutter member and the stopper member can be produced at low production costs. As a result, the adapter itself can be produced at low unit costs. The shutter member can easily be mounted on the adapter by fitting the first base plate of the shutter member into the first bottom wall recesses formed on the bottom wall and fitting the first both side plates of the shutter member into the first sidewall recess. The stopper member can easily be mounted on the adapter by fitting the second base plate of the stopper member into the second bottom wall recess formed on the bottom wall and fitting the second both side plates of the stopper member into the second sidewall recess formed on the both sidewalls and thus, mounting of the shutter member and the stopper member on the adapter is easy and the adapter can be assembled without much expense in time and effort. As a result, the adapter itself can be produced at low unit costs. If the optical connector plug is inserted into the insertion hole of the adapter, the shutter plate of the shutter member falls toward the center portion of the insertion hole by being pressed by the optical connector plug and thus, shielding by the shutter plate is released and laser light can be connected. If the optical connector plug is extracted from the insertion hole, the shutter plate rises owing to the elastic force thereof to shield the insertion hole again so that leakage of laser light from the adapter can reliably be prevented.

In an optical connector adapter in which the connecting plate of the shutter member is fitted into an end face recess formed on an end face of the bottom wall of the adapter, the shutter member is reliably fixed to the adapter by the connecting plate of the shutter member fitted into the end face recess and shifts of the shutter member and detachment of the shutter member from the adapter can be prevented. Therefore, the insertion hole can reliably be shielded by using the shutter member.

In an optical connector adapter in which the first base plate of the shutter member is in close contact with the first bottom wall recess, the first both side plates of the shutter member are in close contact with the first sidewall recess, the second base plate of the stopper member is in close contact with the second bottom wall recess and the first base plate of the shutter member, and the second both side plates of the stopper member is in close contact with the second sidewall recess and the first both side plates of the shutter member. The shutter member is reliably fixed to the adapter by the first base plate of the shutter member in close contact with the first bottom wall recess and the first both side plates of the shutter member in close contact with the first sidewall recess so that shifts of the shutter member and detachment of the shutter member from the adapter can be prevented. Therefore, the insertion hole can reliably be shielded by using the shutter member. The shutter member and the stopper member are reliably fixed to the adapter by the second base plate of the stopper member in close contact with the second bottom wall recess and the first base plate of the shutter member and the second both side plates of the stopper member in close contact with the second sidewall recess and the first both side plates of the shutter member, so that shifts of the shutter member and the stopper member and detachment of the shutter member and the stopper member from the adapter can be prevented.

In an optical connector adapter in which a third bottom wall recess whose recess depth is shallower than that of the second bottom wall recess and a bottom wall step portion connected to the first bottom wall recess and the third bottom wall recess are formed and the first base plate of the shutter member includes a first fitting portion fitted into the first bottom wall recess, a second fitting portion fitted into the third bottom wall recess, and a step fitting portion fitted into the bottom wall step portion. The first fitting portion of the first base plate is fitted into the first bottom wall recess, the second fitting portion of the first base plate is fitted into the third bottom wall recess, and the step fitting portion of the first base plate is fitted into the bottom wall step portion and therefore, the shutter member is reliably fixed ton the adapter, shifts of the shutter member and detachment of the shutter member from the adapter can be prevented and the insertion hole can reliably be shielded by using the shutter member. The step fitting portion formed on the base plate of the shutter member functions as a rib and thus, torsion and bending of the base plate can be prevented and the base plate can reliably be brought into close contact with the first bottom wall recess, the third bottom wall recess, and the bottom wall step portion of the bottom wall. Therefore, the shutter member can reliably be fixed to the adapter.

In an optical connector adapter in which an accommodation recess for accommodating the shutter plate when the shutter plate of the shutter member falls toward the center portion of the insertion hole is formed on the internal surface of the bottom wall, the shutter plate is successively accommodated in the accommodation recess in the process in which the shutter plate falls and therefore, the optical connector plug can smoothly be inserted into the insertion hole and the optical connector plug can smoothly be extracted from the insertion hole without the insertion or extraction of the optical connector plug through ends being hindered by the shutter plate.

In an optical connector adapter in which the shutter plate of the shutter member includes a fixed portion in close contact with the internal surface of the bottom wall, a bent portion bent at a predetermined angle, and a curved portion curved to form a convex shape toward the center portion of the insertion hole, the internal and external surfaces of the bottom wall of the adapter are sandwiched between the base plate and the fixed portion of the shutter plate and therefore, the shutter member is reliably be fixed to the adapter. As a result, shifts of the shutter member and detachment of the shutter member from the adapter can be prevented and the insertion hole can reliably be shielded by using the shutter member. The bent portion of the shutter plate of the shutter member is bent at a predetermined angle toward the center portion of the insertion hole and thus, when the optical connector plug is inserted into the insertion hole, an edge of an extending end of the shutter plate does not come into contact with the optical connector plug. Therefore, damage of the optical connector plug caused by contact of the edge of the extending end of the shutter plate with the optical connector plug can be prevented. The curved portion positioned between the fixed portion and the bent portion of the shutter plate is curved to form a convex shape toward the center portion of the insertion hole and therefore, durability of the shutter plate is improved with the uniform distribution of elastic force (repulsive force) of the shutter plate by the curved portion. Even if the shutter plate repeatedly falls and rises, the elastic force of the shutter plate does not deteriorate and the insertion hole can reliably be shielded by using the shutter plate in repeated uses.

In an optical connector adapter in which the first bottom wall recesses are symmetrically formed, the second bottom wall recesses are symmetrically formed, the third bottom wall recesses are symmetrically formed, the first sidewall recesses are symmetrically formed, and the second sidewall recesses are symmetrically formed by sandwiching a center line therebetween. The shutter member in the same shape can be installed at both ends of the insertion hole and the stopper member in the same shape can be installed at both ends of the insertion hole. The shutter member can be installed at both ends of the insertion hole and the stopper member can be installed at least at one of the both ends and thus, laser light can be shielded at the both ends of the insertion hole. Therefore, there is no danger that eyes of an operator may be exposed to laser light leaked out from the adapter even if insertion/removal work of an optical connector plug is done at the both ends of the insertion hole.

In an optical connector adapter in which the adapter contains at least one partition wall positioned between both sidewalls and includes at least two insertion holes arranged in a lateral direction across the partition wall and in which the shutter member includes at least two connecting plates and two shutter plates arranged in the lateral direction while sharing the base plate, at least two optical connector plugs for optical fiber connection can be inserted into the insertion holes while being arranged in the lateral direction to connect laser light via these optical connector plugs so that optical connections by a plurality of paths can be established at a time. The shutter member can be installed at both ends of the insertion hole and the stopper member can be installed at least at one of the both ends and therefore, laser light can be shielded at both ends of the insertion hole. Therefore, there is no danger that eyes of an operator may be exposed to laser light leaked out from the adapter even if insertion/removal work of an optical connector plug is done at the both ends of the insertion hole. The shutter member is formed of the first base plate, the first both side plates extending upward from both side edges of the first base plate, at least two connecting plates extending upward from the front edge of the first base plate, and at least two shutter plates connected to these connecting plates and curved with a predetermined curvature radius. The stopper member is formed of the second base plate, the second both side plates extending upward from both side edges of the second base plate, and the locking plate formed on the second both side plates and therefore, the shutter member and the stopper member can be mass-produced in a short time by press molding so that the shutter member and the stopper member can be produced at low production costs. As a result, the adapter itself can be produced at low unit costs. The shutter member can easily be mounted on the adapter by fitting the first base plate of the shutter member into the first bottom wall recesses formed on the bottom wall and fitting the first both side plates of the shutter member into the first sidewall recess. The stopper member can easily be mounted on the adapter by fitting the second base plate of the stopper member into the second bottom wall recess formed on the bottom wall and fitting the second both side plates of the stopper member into the second sidewall recess formed on the both sidewalls. Thus, mounting of the shutter member and the stopper member on the adapter is easy and the adapter can be assembled without much expense in time and effort and, as a result, the adapter itself can be produced at low unit costs.

In an optical connector adapter in which the base plate of the shutter plates include a recess positioned between these shutter plates and recessed toward the center portion of the insertion hole. Even if one of the shutter plates of the shutter members falls against the elastic force thereof owing to the insertion of the optical connector plug, the force of falling of the one shutter plate is not transmitted to the other shutter plate arranged in the lateral direction thanks to the recess. Therefore, even if one of the shutter plates falls, the other shutter plate will not fall following the one shutter plate so that the other insertion hole can reliably be shielded by the other shutter plate.

In an optical connector adapter in which the curvature radius of the shutter plate is in the range of 5.0 to 7.5 mm, the curvature radius of the shutter plate is in the above range and therefore, when the optical connector plug is inserted into the insertion hole, an edge of an extending end of the shutter plate does not come into contact with a ferrule of the optical connector plug so that damage of the ferrule caused by contact of the edge of the extending end of the shutter plate with the ferrule of the optical connector plug can be prevented. The shutter plate is curved with the curvature radius toward the center portion of the insertion hole and therefore, durability of the shutter plate is improved with the uniform distribution of elastic force (repulsive force) of the shutter plate. Even if the shutter plate repeatedly falls and rises, the elastic force of the shutter plate does not deteriorate and the insertion hole can reliably be shielded by using the shutter plate even in repeated uses.

In an optical connector adapter in which the thickness dimension of the shutter plate is in the range of 0.01 to 0.1 mm and the elastic/repulsive force of the shutter plate is in the range of 0.1 to 0.6N, the thickness dimension of the shutter plate is in the above range and therefore, the shutter member of the same shape and size can be mass-produced in a short time by press molding so that the shutter member can be produced at low production costs and. As a result, the adapter itself can be produced at low unit costs. The elastic/repulsive force of the shutter plate is in the above range and thus, when the optical connector plug is inserted into the insertion hole, the shutter plate of the shutter member reliably falls toward the center portion of the insertion hole and therefore, shielding by the shutter plate can reliably be released. When the optical connector plug is extracted from the insertion hole, the shutter plate reliably rises owing to the elastic force thereof and thus, the insertion hole can reliably be shielded.

DETAILED DESCRIPTION OF THE EMBODIMENT

Figure 1:
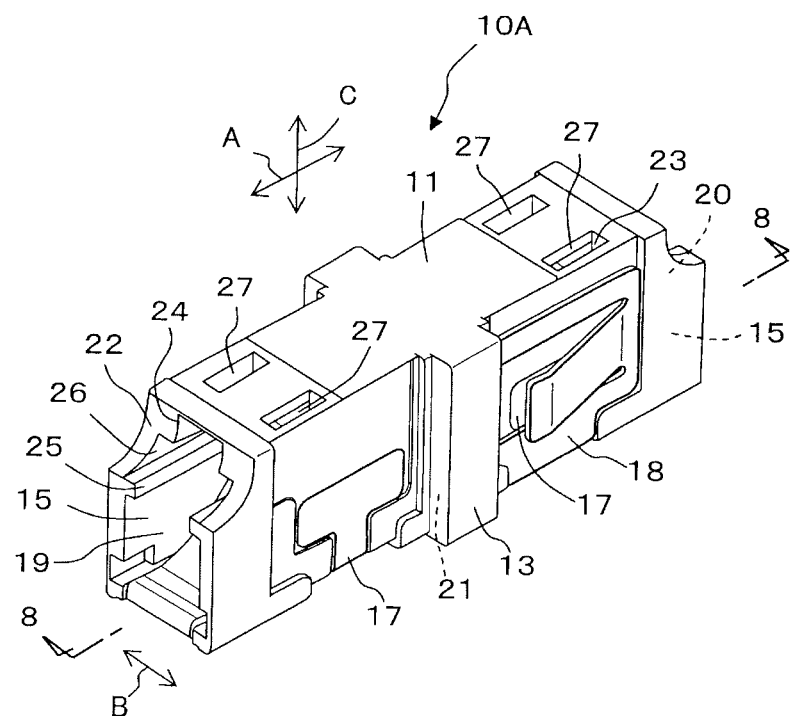
FIG. 1 is a perspective view of an optical connector adapter shown as an example.
Figure 2:
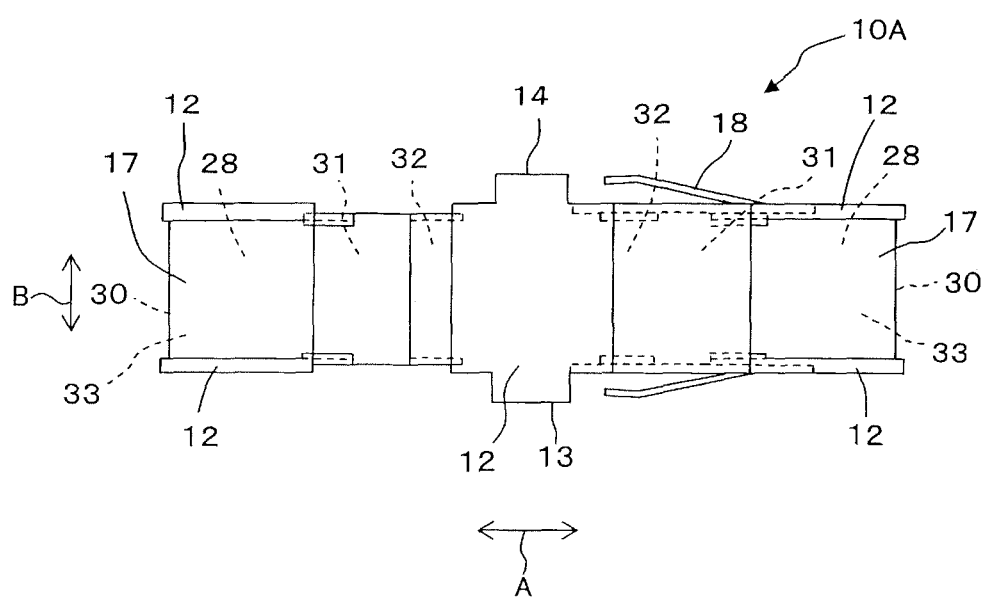
FIG. 2 is a bottom view showing a bottom wall of the adapter.
Figure 3:
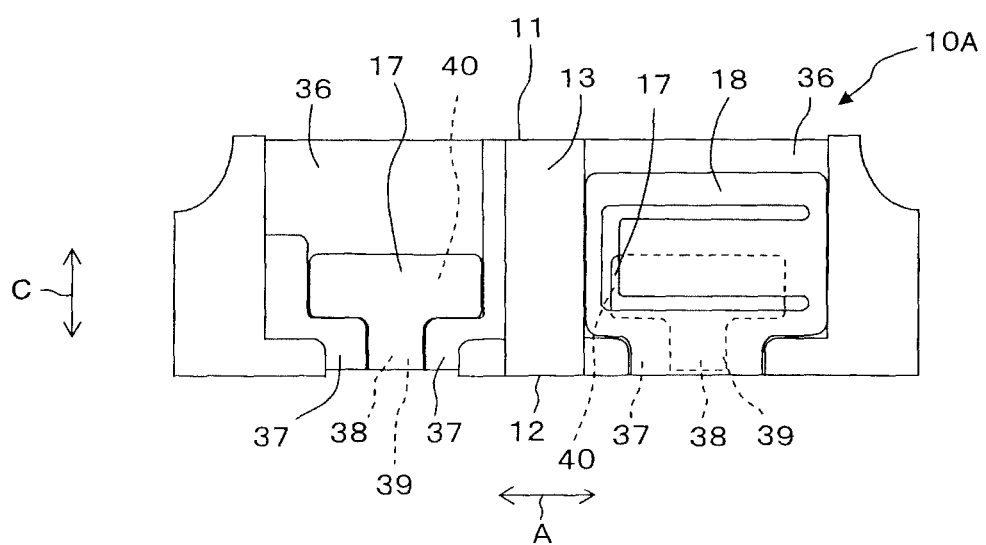
FIG. 3 is a side view showing a sidewall of the adapter.
Figure 4:
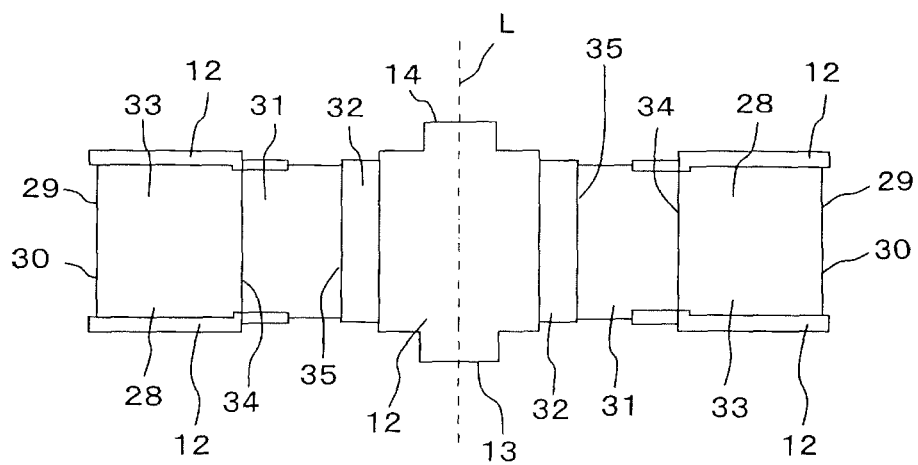
FIG. 4 is a bottom view showing the bottom wall of the adapter before a shutter member and a stopper member are mounted.
Figure 5:
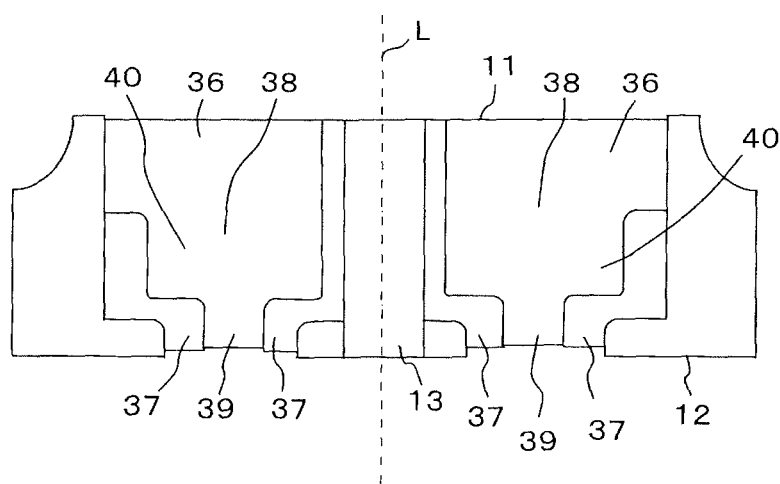
FIG. 5 is a side view showing the sidewall of the adapter before the shutter member and the stopper member are mounted.
Figure 6:
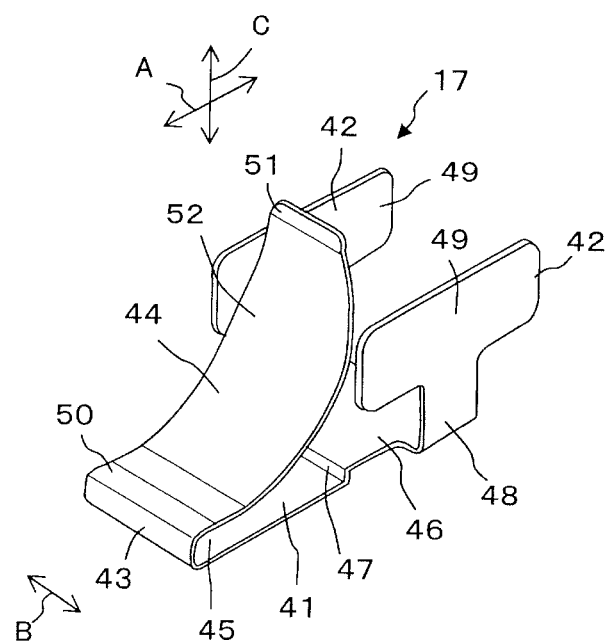
FIG. 6 is a perspective view of the shutter member shown as an example.
Figure 7:
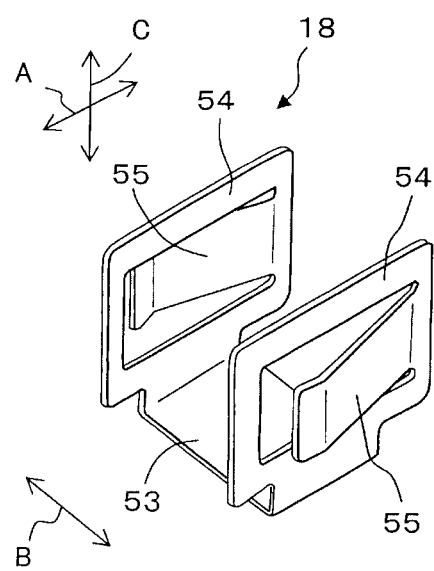
FIG. 7 is a perspective view of the stopper member shown as an example.
Figure 8:
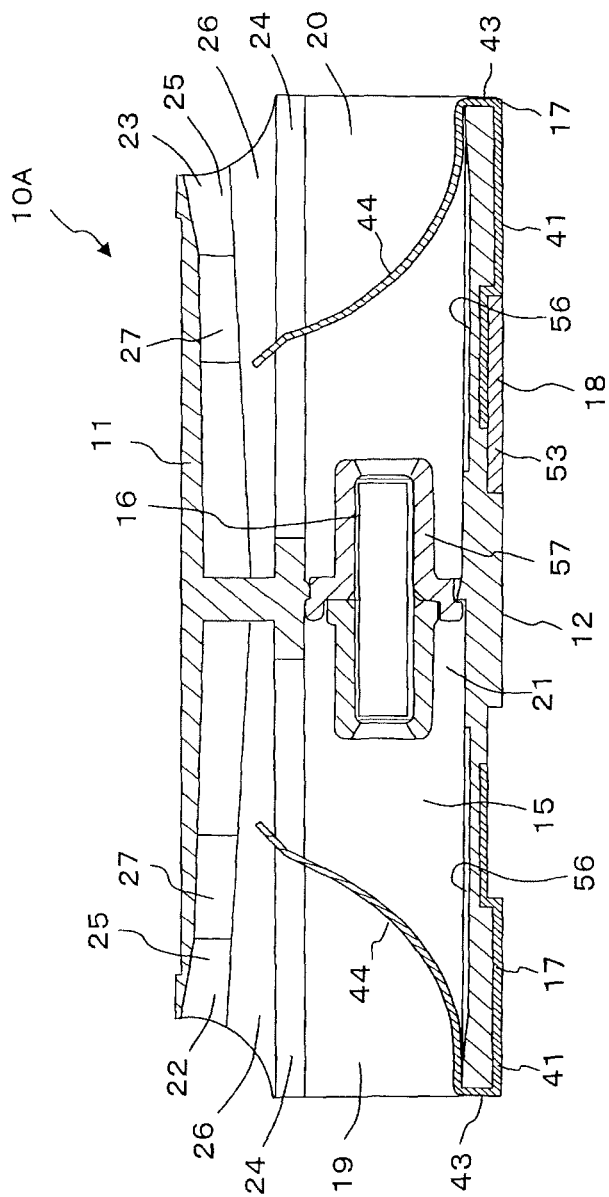
FIG. 8 is a sectional view on an 8-8 line arrow of FIG. 1.

Details of an optical connector adapter according to the present invention will be described as shown below with reference to appended drawings such as FIG. 1 as a perspective view of an optical connector adapter shown as an example. FIG. 2 is a bottom view showing a bottom wall 12 of an adapter 10A and FIG. 3 is a side view showing a sidewall 13 of the adapter 10A. FIG. 4 is a bottom view showing the bottom wall 12 of the adapter 10A before a shutter member 17 (shielding metal fitting) and a stopper member 18 (locking metal fitting) are mounted and FIG. 5 is a side view showing the sidewall 13 of the adapter 10A before the shutter member 17 and the stopper member 18 are mounted. FIG. 6 is a perspective view of the shutter member 17 shown as an example and FIG. 7 is a perspective view of the stopper member 18 shown as an example. FIG. 8 is a sectional view on an 8-8 line arrow of FIG. 1. In FIGS. 1 to 3, 6, and 7, the front-back direction is indicated by an arrow A, a lateral direction by an arrow B, and an up-down direction by an arrow C.

In optical communication in which laser light (optical signal) oscillated from an optical oscillating apparatus such as a semiconductor laser is transmitted by using an optical fiber, the optical connector adapter 10A is used as a connection unit to connect the optical fiber. The adapter 10A is a housing made of synthetic resin or metal such as zinc die casting and the shape thereof is formed symmetrically by sandwiching a center line L indicated by alternate short and long dashed lines in FIGS. 4, 5 therebetween (the shape thereof is in a mirror image relationship).

The adapter 10A includes top/bottom walls 11, 12 separated and facing each other in the up-down direction and extending in the front-back direction, both sidewalls 13, 14 separated and facing each other in the lateral direction and extending in the front-back direction, an insertion hole 15 surrounded by these walls 11 to 14 and cutting through in the front-back direction, a sleeve holder 57 and a segment sleeve for optical connection 16 installed in the insertion hole 15 (see FIG. 8), the shutter member 17 made of metal (for example, a stainless steel plate for spring), and the stopper member 18 made of metal (for example, a stainless steel plate for spring). The both sidewalls 13, 14 are perpendicular to the top/bottom walls 11, 12 and are connected to these walls 11, 12.

The insertion hole 15 includes a pair of both ends 19, 20 separated and facing each other in the front-back direction and a center portion 21 positioned between the both ends 19, 20. An optical connector plug 58 described later is removably inserted into the insertion hole 15. The sleeve holder 57 is formed in a hollow cylindrical shape and is positioned in the center portion 21 of the insertion hole 15 to extend in the front-back direction. The segment sleeve for optical connection 16 is positioned in the center portion 21 of the insertion hole 15 and extends in the front-back direction while being held inside the sleeve holder 57. When the optical connector plug 58 is inserted into the insertion hole 15, the sleeve 16 supports a ferrule 62 in a cylindrical shape exposed from an end of the optical connector plug 58 (see FIG. 10).

Two engaging portions 22, 23 (see FIG. 8) with which an engaging member 61 (see FIGS. 9, 10) of the optical connector plug 58 is removably engaged are formed in the both ends 19, 20 of the adapter 10A. These engaging portions 22, 23 are formed symmetrically with respect to the both ends 19, 20 sandwiching the center line L dividing the adapter 10A in the front-back direction therebetween (the engaging portions 22, 23 are in a mirror image relationship). These engaging portions 22, 23 are formed of a first flange 24 formed in the both sidewalls 13, 14 and extending from the both ends 19, 20 toward the center portion 21 in the front-back direction, a second flange 25 formed at an intersection of the top wall 11 and the both sidewalls 13, 14 and extending from the both ends 19, 20 toward the center portion 21 in the front-back direction, a guide groove 26 positioned between these flanges 24, 25 and extending in the front-back direction, and an insertion opening 27 formed in the top wall 11 and into which an insertion protrusion 69 (see FIGS. 9, 10) of the engaging member 61 of the optical connector plug 58 is removably inserted. The second flange 25 is inclined downward in the up-down direction from the both ends 19, 20 toward the center portion 21.

Two bottom wall recesses 28 located in the front-back direction across the center line L are formed on an external surface of the bottom wall 12 of the adapter 10A. These bottom wall recesses 28 are formed symmetrically by sandwiching the center line L therebetween (the bottom wall recesses 28 are in a mirror image relationship). Two end face recesses 30 recessed toward the center portion 21 of the insertion hole 15 are formed on both end faces 29 of the bottom wall 12 of the adapter 10A. These end face recesses 30 are formed symmetrically by sandwiching the center line L therebetween (the end face recesses 30 are in a mirror image relationship).

As shown in FIG. 4, the bottom wall recesses 28 are formed of a substantially rectangular first bottom wall recess 31 positioned on the side of the both ends 19, 20 of the insertion hole 15 (front side in the front-back direction of the center line L) and recessed in the up-down direction from the external surface of the bottom wall 12 toward the internal surface thereof, a substantially rectangular second bottom wall recess 32 positioned on the side of the center portion 21 (rear side in the front-back direction of the first bottom wall recess 31) and recessed in the up-down direction from the external surface of the bottom wall 12 toward the internal surface thereof, a substantially rectangular third bottom wall recess 33 positioned on the side of the both end faces 29 of the bottom wall 12 from the first bottom wall recess 31 (front side in the front-back direction of the first bottom wall recess 31) and recessed in the up-down direction from the external surface of the bottom wall 12 toward the internal surface thereof, a first bottom wall step portion 34 connected to the first bottom wall recess 31 and the third bottom wall recess 33, and a second bottom wall step portion 35 connected to the first bottom wall recess 31 and the second bottom wall recess 32.

The first bottom wall recesses 31 are formed symmetrically across the center line L (the first bottom wall recesses 31 are in a mirror image relationship). The second bottom wall recesses 32 are formed symmetrically across the center line L (the second bottom wall recesses 32 are in a mirror image relationship). The second bottom wall recesses 32 has a recess depth (recess dimension of the second bottom wall recess 32 from the external surface of the bottom wall 12 toward the internal surface thereof) shallower than that of the first bottom wall recess 31 and deeper than that of the third bottom wall recess 33.

The third bottom wall recesses 33 are formed symmetrically across the center line L (the third bottom wall recesses 33 are in a mirror image relationship). The third bottom wall recess 33 has a recess depth (recess dimension of the third bottom wall recess 33 from the external surface of the bottom wall 12 toward the internal surface thereof) is shallower than that of the second bottom wall recess 32. In the third bottom wall recess 33, both edges thereof in the lateral direction are positioned on the inner side of the bottom wall 12 and a step height arises between the both edges of the third bottom wall recess 33 in the lateral direction and the bottom wall 12 so that the bottom wall 12 becomes a barrier to the third bottom wall recess 33. A step height arises between the second bottom wall recess 32 and the bottom wall 12 so that the bottom wall 12 becomes a barrier to the second bottom wall recess 32. A step height arises between the first bottom wall recess 31 and the second bottom wall recess 32 so that the second bottom wall recess 32 becomes a barrier to the first bottom wall recess 31 and a step height arises between first bottom wall recess 31 and the third bottom wall recess 33 so that the third bottom wall recess 33 becomes a barrier to the first bottom wall recess 31.

Two accommodation recesses 56 located in the front-back direction across the center line L are formed on an internal surface of the bottom wall 12 of the adapter 10A. These accommodation recesses 56 are formed symmetrically by sandwiching the center line L therebetween (the accommodation recesses 56 are in a mirror image relationship). These accommodation recesses 56 are recessed in the up-down direction from the internal surface of the bottom wall 12 toward the external surface. These accommodation recesses 56 have a plane shape slightly larger than that of a bent portion 51 and a curved portion 52 described later of the shutter member 17 and so can accommodate the bent portion 51 and the curved portion 52.

A sidewall recess 36 recessed in the lateral direction from the external surface of the both sidewalls 13, 14 of the adapter 10A toward the internal surface thereof is formed on the external surface thereof. The sidewall recesses 36 are formed in the same shape on the one sidewall 13 and on the other sidewall 14 and formed symmetrically across the center line L (the sidewall recesses 36 are in a mirror image relationship). As shown in FIG. 5, the sidewall recess 36 is formed of a first sidewall recess 37 positioned on the side of the bottom wall 12 and connected to the second bottom wall recess 32 and a second sidewall recess 38 positioned on the inner side of the first sidewall recess 37 and connected to the first bottom wall recess 31.

The second sidewall recess 38 has a recess depth (recess dimension of the second sidewall recess 38 from the external surface of the both sidewalls 13, 14 toward the internal surface thereof) deeper than that of the first sidewall recess 37. The second sidewall recess 38 includes a narrow portion 39 connected to the first bottom wall recess 31 and whose width dimension in the front-back direction is narrow and a wide portion 40 connected to the narrow portion 39 and whose width dimension in the front-back direction is wider than that of the narrow portion 39. A step height arises between the first sidewall recess 37 and the both sidewalls 13, 14 so that the both sidewalls 13, 14 become a barrier to the first sidewall recess 37. A step height arises between the first sidewall recess 37 and the second sidewall recess 38 so that the first sidewall recess 37 becomes a barrier to the second sidewall recess 38.

As shown in FIG. 6, the shutter member 17 is formed of a substantially rectangular base plate 41 (first base plate), both side plates 42 (first both side plates) extending upward from both side edges of the base plate 41, a connecting plate 43 positioned between the both side plates 42 and extending upward from the front edge of the base plate 41, and a shutter plate 44 connected to the connecting plate 43 and extending upward from the base plate 41. The base plate 41 of the shutter member 17 includes a first fitting portion 45 positioned on the front side in the front-back direction (the side of the both ends 19, 20 of the insertion hole 15), a second fitting portion 46 positioned on the rear side in the front-back direction (the side of the center portion 21 of the insertion hole 15), and a step fitting portion 47 positioned between the first and second fitting portions 45, 46.

The first fitting portion 45 of the base plate 41 has a plane shape substantially the same as the shape of the third bottom wall recess 33 in shape and size and the second fitting portion 46 has a plane shape substantially the same as the shape of the first bottom wall recess 31 in shape and size. The step fitting portion 47 has a plane shape substantially the same as the shape of the first bottom wall step portion 34 in shape and size. The both side plates 42 of the shutter member 17 have a plane shape substantially the same as the shape of the second sidewall recess 38 in shape and size. The both side plates 42 have a narrow portion 48 connected to the base plate 41 and whose width dimension in the front-back direction is narrow and a wide portion 49 connected to the narrow portion 48 and whose width dimension in the front-back direction is wider than that of the narrow portion 48. The narrow portion 48 has a plane shape substantially the same as that of the narrow portion 39 of the second sidewall recess 38 in shape and size. The wide portion 49 has a plane shape substantially the same as that of the wide portion 40 of the second sidewall recess 38 in shape and size.

The shutter plate 44 is elastically deformable with the side of the connecting plate 43 set as the base end. The shutter plate 44 includes a fixed portion 50 positioned at the base end and connected to the connecting plate 43, the bent portion 51 positioned at an extending end thereof, the curved portion 52 positioned between the fixed portion 50 and the bent portion 51. The bent portion 51 is bent at a predetermined angle toward the center portion 21 of the insertion hole 15. The curved portion 52 has a predetermined curvature radius and draws an arc so that the arc is convex toward the center portion 21 of the insertion hole 15.

As shown in FIG. 1, the shutter member 17 is removably fixed to the both ends 19, 20 of the insertion hole 15. The procedure for installing the shutter member 17 on the both ends 19, 20 is: after the both side plates 42 of the shutter member 17 are pushed outward against the elastic force thereof in the lateral direction to widen, the shutter member 17 is positioned so that the shutter plate 44 is positioned inside the both ends 19, 20 of the insertion hole 15 and also the connecting plate 43 is positioned in the end face recess 30 of the bottom wall end face 29 and the both side plates 42 are fitted into the second sidewall recess 38. If the both side plates 42 are fitted into the second sidewall recess 38, the base plate 41 of the shutter member 17 is fitted into the bottom wall recesses 28.

The first fitting portion 45 of the base plate 41 of the shutter member 17 is fitted into the third bottom wall recess 33 and is fitted to and in close contact with the whole third bottom wall recess 33. When the first fitting portion 45 is fitted to the third bottom wall recess 33, the external surface of the first fitting portion 45 and the external surface of the bottom wall 12 are substantially flush with each other. The second fitting portion 46 of the base plate 41 of the shutter member 17 is fitted into the first bottom wall recess 31 and is fitted to and in close contact with the whole first bottom wall recess 31. When the second fitting portion 46 is fitted to the first bottom wall recess 31, the external surface of the second fitting portion 46 and the second bottom wall recess 32 are substantially flush with each other. The step fitting portion 47 of the base plate 41 of the shutter member 17 is fitted to and in close contact with the first bottom wall step portion 34.

The both side plates 42 of the shutter member 17 are fitted into the second sidewall recess 38 and are fitted to and in close contact with the second sidewall recess 38. When the both side plates 42 are fitted to the second sidewall recess 38, the external surface of the both side plates 42 and the external surface of the first sidewall recess 37 are flush with each other. The narrow portion 48 of the both side plates 42 is fitted into the narrow portion 39 of the second sidewall recess 38 and is fitted to and in close contact with the whole portion 39. The wide portion 49 of the both side plates 42 is fitted into the wide portion 40 of the second sidewall recess 38 and is fitted to and in close contact with the portion 40.

The connecting plate 43 of the shutter member 17 is fitted to and in close contact with the end face recess 30 of the bottom wall end face 29. The bent portion 51 and the curved portion 52 of the shutter plate 44 of the shutter member 17 are positioned at the both ends 19, 20 of the insertion hole 15 to shield the insertion hole 15. In the shutter member 17, the internal and external surfaces of the bottom wall 12 of the adapter 10A are sandwiched between the first fitting portion 45 of the base plate 41 and the fixed portion 50 of the shutter plate 44.

As shown in FIG. 7, the stopper member 18 is formed of a substantially rectangular base plate 53 (second base plate), both side plates 54 (second both side plates) extending upward from both side edges of the base plate 53, and a locking plate 55 formed on the both side plates 54 and extending by being tilted to spread out outward in the lateral direction. The base plate 53 of the stopper member 18 has a plane shape substantially the same as a combined shape of the first bottom wall recess 31 and the second bottom wall recess 32 in shape and size. The both side plates 54 of the stopper member 18 have a plane shape substantially the same as a combined shape of the first sidewall recess 37 and the second sidewall recess 38 in shape and size.

The procedure for installing the stopper member 18 on the end 20 is: after the both side plates 54 of the stopper member 18 are pushed outward against the elastic force thereof in the lateral direction to widen, the stopper member 18 is positioned so that the stopper member 18 is overlaid on the shutter member 17 and the both side plates 54 are fitted into the first sidewall recess 37. If the both side plates 54 are fitted into the first sidewall recess 37, the base plate 53 of the stopper member 18 is fitted into the bottom wall recesses 28.

The stopper member 18 is removably fixed to the one end 20 of the adapter 10A while being overlaid on the shutter member 17. The base plate 53 of the stopper member 18 is fitted into the second bottom wall recess 32 while being overlaid on the second fitting portion 46 of the base plate 41 of the shutter member 17 and is fitted to and in close contact with the whole second bottom wall recess 32. When the base plate 53 is fitted to the second bottom wall recess 32, the external surface of the base plate 53 and the second bottom wall recess 32 are substantially flush with each other. The both side plates 54 of the stopper member 18 are fitted into the first sidewall recess 37 while being overlaid on the both side plates 42 of the shutter member 17 and is fitted to and in close contact with the whole first sidewall recess 37. When the both side plates 54 are fitted to the first sidewall recess 37, the external surface of the both side plates 54 and the external surface of the both sidewalls 13, 14 are substantially flush with each other.

Figure 9:
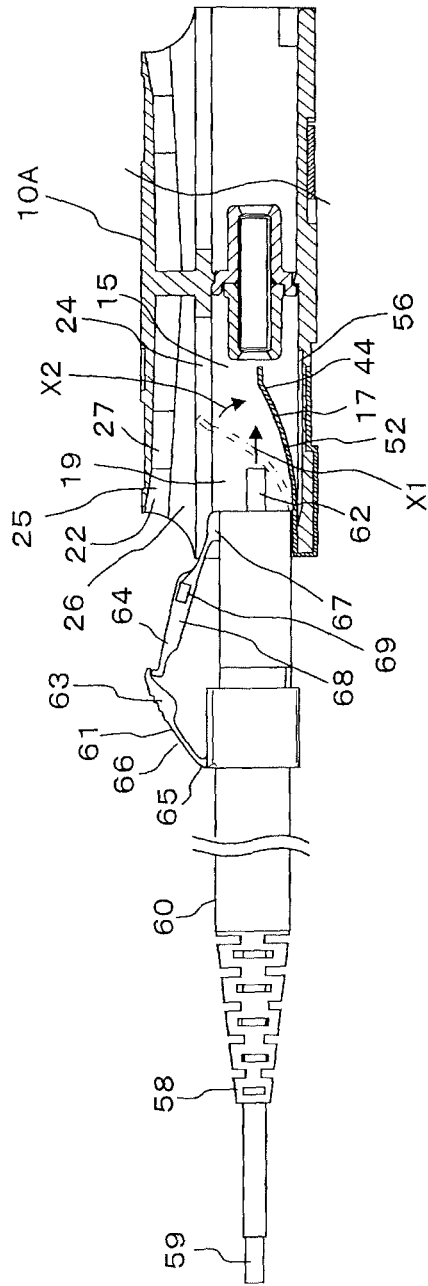
FIG. 9 is, like FIG. 8, a sectional arrow view showing an insertion process of an optical connector plug into an end of an insertion hole of the optical connector adapter.
Figure 10:
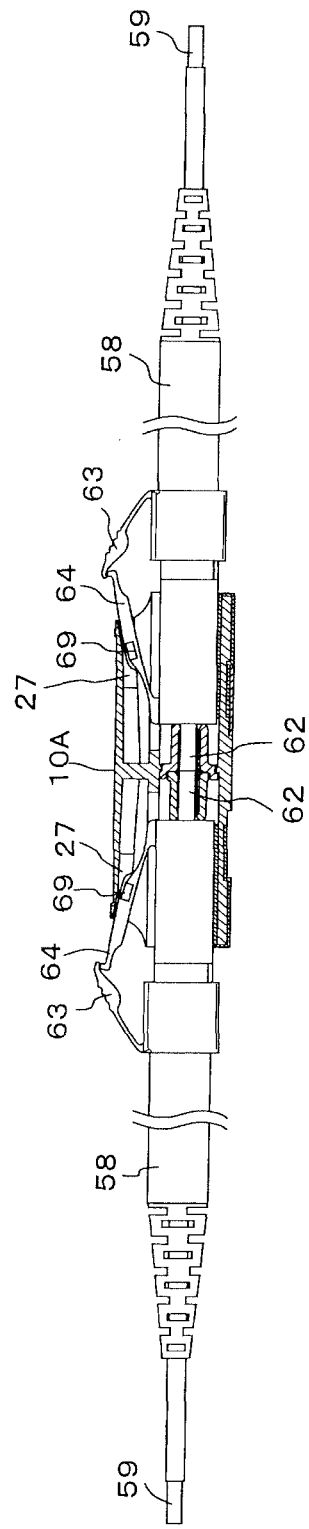
FIG. 10 is, like FIG. 8, a sectional arrow view after the optical connector plug is inserted into both ends of the insertion hole of the optical connector adapter.

FIG. 9 is, like FIG. 8, a sectional arrow view showing an insertion process of the optical connector plug 58 through the end 19 of the insertion hole 15 of the optical connector adapter 10A and FIG. 10 is, like FIG. 8, a sectional arrow view after the optical connector plug 58 is inserted through the both ends 19, 20 of the insertion hole 15 of the optical connector adapter 10A. In FIG. 9, an illustration of the other end 20 is not shown. Though not illustrated, the adapter 10A is mounted at predetermined positions of a mounting panel, various apparatuses, and various devices used for optical communication by using the locking plate 55 of the stopper member 18.

As shown in FIGS. 9 and 10, the optical connector plug 58 is formed of a sheath member 60 fixing an optical fiber 59 and the engaging member 61 removably engaged with the engaging portions 22, 23 of the adapter 10A. A portion of the ferrule 62 is exposed from the tip of the optical connector plug 58.

The sheath member 60 is made of synthetic resin, has flexibility and covers an entire outer circumferential surface of the optical fiber 59. The engaging member 61 includes a picking portion 63 made of synthetic resin and elastically deformable and an engaging portion 64 made of synthetic resin and elastically deformable.

The picking portion 63 includes a base end portion 65 positioned in the center of the sheath member 60 and fixed to the external surface of the sheath member 60 and a free portion 66 inclined upward in the up-down direction base end portion 65 and extending in the front-back direction. The engaging portion 64 includes a base end portion 67 positioned at the front end of the sheath member 60 and fixed to the external surface of the sheath member 60 and a free portion 68 inclined upward in the up-down direction from the base end portion 67 and extending in the front-back direction. The free portion 68 of the engaging portion 64 has a projecting end overlaid below a projecting end of the free portion 66 of the picking portion 63. The free portion 68 of the engaging portion 64 has the insertion protrusion 69 formed in a convex shape outward in the lateral direction on both side thereof.

If the picking portion 63 is pressed down in the up-down direction in the optical connector plug 58, the free portion 66 of the picking portion 63 turns around the base end portion 65 as a pivot downward in the up-down direction and also with the turning of the free portion 66, the free portion 68 of the engaging portion 64 turns around the base end portion 67 as a pivot downward in the up-down direction and the insertion protrusion 69 moves downward in the up-down direction.

While the optical connector plug 58 is not inserted through the both ends 19, 20 of the insertion hole 15 of the adapter 10A, as shown in FIG. 8, the shutter plate 44 (the bent portion 51 and the curved portion 52) of the shutter member 17 rises upward in the up-down direction to cover the both ends 19, 20. As shown by an arrow X1 in FIG. 9, if the optical connector plug 58 is pushed through the end 19 of the insertion hole 15 of the adapter 10A, the sheath member 60 of the optical connector plug 58 gradually advances through the end 19 opened below the first flange 24 of the end 19 and also the engaging portion 64 of the engaging member 61 of the optical connector plug 58 gradually advances into the guide groove 26 between the first and second flanges 24, 25.

If the sheath member 60 advances into the end 19, the bottom edge of the sheath member 60 touches the curved portion 52 of the shutter plate 44 and presses the curved portion 52 toward the center portion 21 of the insertion hole 15 (presses to the rear side in the front-back direction). As the engaging portion 64 of the engaging member 61 of the optical connector plug 58 gradually advances into the guide groove 26, the engaging portion 64 touches the second flange 25 and slides and the second flange 25 presses the engaging portion 64 downward in the up-down direction.

If the sheath member 60 presses the curved portion 52, as shown by an arrow X2 in FIG. 9, the sheath member 60 elastically deforms the curved portion 52 against the elastic force of the curved portion 52 of the shutter plate 44. While being elastically deformed, the curved portion 52 gradually falls toward the center portion 21 of the insertion hole 15. If the second flange 25 presses the engaging portion 64, the second flange 25 elastically deforms the engaging portion 64 against the elastic force of the engaging portion 64. While being elastically deformed, the free portion 68 of the engaging portion 64 turns around the base end portion 67 as a pivot downward in the up-down direction and the insertion protrusion 69 moves downward in the up-down direction.

If the optical connector plug 58 is further pushed through the end 19 of the insertion hole 15 of the adapter 10A, the free portion 68 of the engaging portion 64 further turns downward in the up-down direction and when the insertion protrusion 69 of the free portion 68 of the engaging portion 64 comes to the position of the insertion opening 27 of the top wall 11, the free portion 68 of the engaging portion 64 is deformed upward in the up-down direction by the elastic force (repulsive force) thereof and the insertion protrusion 69 of the free portion 68 is inserted into the insertion opening 27 of the top wall 11. If the insertion protrusion 69 is inserted into the insertion opening 27, as shown in FIG. 10, the insertion of the optical connector plug 58 through the both ends 19, 20 of the insertion hole 15 of the adapter 10A is completed, the bent portion 15 and the curved portion 52 of the shutter plate 44 fall so that the bent portion 51 and the curved portion 52 are accommodated in the accommodation recesses 56 and also the ferrule 62 exposed from the optical connector plug 58 is accommodated in the sleeve 16. If the optical connector plug 58 is inserted through the both ends 19, 20 of the insertion hole 15 of the adapter 10A, the ferrules 62 touch inside the sleeve 16 so that the optical fibers 59 are optically connected.

To remove the optical connector plug 58 from the both ends 19, 20, the picking portion 63 of the engaging member 61 is pressed downward in the up-down direction. If the picking portion 63 is pressed downward in the up-down direction, the free portion 66 of the picking portion 63 turns around the base end portion 65 as a pivot downward in the up-down direction and also with the turning of the free portion 66 and also with the turning of the free portion 66, the free portion 68 of the engaging portion 64 turns around the base end portion 67 as a pivot downward in the up-down direction and the insertion protrusion 69 moves downward in the up-down direction. If the insertion protrusion 69 moves downward in the up-down direction, the insertion protrusion 69 moves away from the insertion opening 27 and in this state, the optical connector plug 58 is pulled in the extraction direction of the adapter 10A.

If the optical connector plug 58 is pulled in an extraction direction of the adapter 10A, the engaging portion 64 of the engaging member 61 of the optical connector plug 58 slides through the guide groove 26 and the sheath member 60 slides the both ends 19, 20 so that the sheath member 60 and the engaging member 61 are gradually extracted from the both ends 19, 20. Accordingly, the curved portion 52 of the shutter plate 44 gradually rises owing to the elastic force (repulsive force) thereof. If the optical connector plug 58 is extracted from the adapter 10A completely, the bent portion 51 and the curved portion 52 rise completely to restore the state before insertion of the optical connector plug 58 and the bent portion 51 and the curved portion 52 shield the insertion hole 15 of the adapter 10A.

If the optical connector plug 58 is inserted into the insertion hole 15 of the adapter 10A for optical connection, the bent portion 51 and the curved portion 52 of the shutter plate 44 of the shutter member 17 are pressed by the optical connector plug 58 and fall toward the center portion 21 of the insertion hole 15 so that shielding by the shutter plate 44 is released and the optical fibers 59 can optically be connected. If the optical connector plug 58 is extracted from the insertion hole 15, the shutter plate 44 rises owing to the elastic force thereof to shield the insertion hole 15 again so that leakage of light from the adapter 10A can reliably be prevented.

In the adapter 10A, the curved portion 52 of the shutter plate 44 of the shutter member 17 has a curvature radius in the range of 5.0 to 7.5. If the curvature radius is less than 5.0, the curved portion 52 of the shutter plate 44 may come into contact with the ferrule 62 of the optical connector plug 58 when the optical connector plug 58 is inserted into the insertion hole 15, thereby damaging the ferrule 62. If the curvature radius exceeds 7.5, the both ends 19, 20 of the insertion hole 15 may not be shielded completely by using the shutter plate 44.

Because the curvature radius of the curved portion 52 of the shutter plate 44 is in the above range, when the optical connector plug 58 is inserted through the both ends 19, 20 of the insertion hole 15, the shutter plate 44 does not come into contact with the ferrule 62 of the optical connector plug 58 in the adapter 10A so that damage of the ferrule 62 caused by contact of the shutter plate 44 with the ferrule 62 can be prevented. Because the curved portion 52 of the shutter plate 44 is curved with the above curvature radius toward the center portion 21 of the insertion hole 15 in the adapter 10A, durability of the shutter plate 44 is improved with the uniform distribution of elastic force of the curved portion 52 of the shutter plate 44 and even if the shutter plate 44 repeatedly falls and rises, the insertion hole 15 can reliably be shielded by using the shutter plate 44 in repeated uses without deterioration of the elastic force of the shutter plate 44.

The thickness dimension of the shutter member 17 of the adapter 10A is in the range of 0.01 to 0.1 mm, preferably in the range of 0.02 to 0.06 mm, and particularly preferably in the range of 0.03 to 0.035 mm. The elastic/repulsive force of the curved portion 52 of the shutter plate 44 is in the range of 0.1 to 0.6 N and preferably in the range of 0.2 to 0.4 N. If the thickness dimension of the shutter member 17 exceeds 0.1 mm, the elastic/repulsive force of the curved portion 52 of the shutter plate 44 is more than needed so that it becomes difficult for the curved portion 52 to fall and the optical connector plug 58 may not be smoothly inserted through the both ends 19, 20 of the insertion hole 15 of the adapter 10A. If the thickness dimension of the shutter member 17 is less than 0.01 mm, the strength of the shutter member 17 deteriorates and when the shutter plate 44 repeatedly falls and rises, the elastic force of the curved portion 52 of the shutter plate 44 may deteriorate in an early stage so that the insertion hole 15 may not be shielded by using the shutter plate 44.

If the elastic/repulsive force of the curved portion 52 of the shutter plate 44 exceeds 0.6 N, it becomes difficult for the curved portion 52 to fall and the optical connector plug 58 may not be smoothly inserted through the both ends 19, 20 of the insertion hole 15 of the adapter 10A. If the elastic/repulsive force of the curved portion 52 of the shutter plate 44 is less than 0.1 N, when the shutter plate 44 repeatedly falls and rises, the elastic force of the curved portion 52 of the shutter plate 44 may deteriorate in an early stage so that the insertion hole 15 may not be shielded by using the shutter plate 44. Incidentally, the elastic/repulsive force of the curved portion 52 of the shutter plate 44 is measured by inserting a push-pull gauge (not shown) into the insertion hole 15 of the adapter 10A and using the gauge. The elastic/repulsive force of the curved portion 52 is the maximum value measured by the push-pull gauge.

Because the thickness dimension of the shutter member 17 is in the above range, the shutter member 17 in the shape and size can be mass-produced in a short time by press molding. Therefore, the shutter member 17 can be produced at low production costs. As a result, the adapter 10A itself can be produced at low unit costs. Moreover, the optical connector plug 58 can smoothly be inserted into the insertion hole 15 of the adapter 10A. Even if the shutter plate 44 repeatedly falls and rises, the elastic force of the curved portion 52 of the shutter plate 44 does not deteriorate so that the insertion hole 15 can reliably be shielded by using the shutter plate 44.

Because the elastic/repulsive force of the shutter plate 44 is in the above range, when the optical connector plug 58 is inserted into the insertion hole 15 thereof, the shutter plate 44 of the shutter member 17 reliably falls toward the center portion 21 of the insertion hole 15. Therefore, shielding by the shutter plate 44 of the shutter member 17 can reliably be released. When the optical connector plug 58 is pulled out of the insertion hole 15, the curved portion 52 of the shutter plate 44 reliably rises owing to the elastic force (repulsive force) thereof. Therefore, the insertion hole 15 can reliably be shielded.

The shutter member 17 of the adapter 10A is formed of the base plate 41, the both side plates 42 extending upward from both side edges of the base plate 41, the connecting plate 43 extending upward from the front edge of the base plate 41, and the shutter plate 44 connected to the connecting plate 43 and curved with the predetermined curvature radius. Thus, the number of parts of the shutter member 17 is small. When the shutter member 17 is produced by press molding, the level of difficulty of processing is low, so that the shutter member 17 in the same shape and size can be mass-produced in a short time by press molding. The stopper member 18 of the adapter 10A is formed of the base plate 53, the both side plates 54 extending upward from both side edges of the base plate 53, and the locking plate 55 formed on the both side plates 54. Thus, not only the shutter member 17, but also the stopper member 18 can be mass-produced in a short time by press molding so that the shutter member 17 and the stopper member 18 can be produced at low production costs. As a result, the adapter 10A itself can be produced at low unit costs.

The shutter member 17 can easily be mounted on the adapter 10A by fitting the base plate 41 of the shutter member 17 into the bottom wall recesses 28 formed on the external surface of the bottom wall 12 of the adapter 10A and fitting the both side plates 42 of the shutter member 17 into the sidewall recess 36 formed on the external surface of the both sidewalls 13, 14. The stopper member 18 can easily be mounted on the adapter 10A by fitting the base plate 53 of the stopper member 18 into the bottom wall recesses 28 formed on the external surface of the bottom wall 12 of the adapter 10A and fitting the both side plates 54 of the stopper member 18 into the sidewall recess 36 formed on the external surface of the both sidewalls 13, 14 so that the stopper member 18 is overlaid on the shutter member 17. The shutter member 17 and the stopper member 18 can easily be mounted on the adapter 10A and the adapter 10A can be assembled without much expense in time and effort and, as a result, the adapter 10A itself can be produced at low unit costs.

In the adapter 10A, the first fitting portion 45 of the base plate 41 of the shutter member 17 is fitted into the third bottom wall recess 33, the second fitting portion 46 of the base plate 41 is fitted into the first bottom wall recess 31, and the step fitting portion 47 of the base plate 41 is fitted into the bottom wall step portion 34. Thus, the shutter member 17 is reliably fixed to the adapter 10A and shifts of the shutter member 17 and detachment of the shutter member 17 from the adapter 10A can be prevented so that the insertion hole 15 can reliably be shielded by using the shutter member 17. In the adapter 10A, the step fitting portion 47 formed on the base plate 41 of the shutter plate 17 functions as a rib. Thus, torsion and bending of the base plate 41 can be prevented and the base plate 41 can reliably be brought into close contact with the bottom wall recess 28 of the bottom wall 12 so that the shutter member 17 can reliably be fixed to the adapter 10A.

The internal and external surfaces of the bottom wall 12 of the adapter 10A is sandwiched between the base plate 41 and the fixed portion 50 of the shutter plate 44. Thus, the shutter member 17 is reliably be fixed to the adapter 10A and shifts of the shutter member 17 and detachment of the shutter member 17 from the adapter 10A can be prevented so that the insertion hole 15 can reliably be shielded by using the shutter member 17. In the adapter 10A, the bent portion 51 of the shutter plate 44 of the shutter member 17 is bent at a predetermined angle toward the center portion 21 of the insertion hole 15. Thus, when the optical connector plug 58 is inserted into the insertion hole 15, an edge of the extending end of the shutter plate 44 does not come into contact with the optical connector plug 58 and therefore, damage of the optical connector plug 58 caused by contact of the edge of the extending end of the shutter plate 44 with the optical connector plug 58 can be prevented. In the adapter 10A, the curved portion 52 of the shutter plate 44 is curved so as to form a convex shape toward the center portion 21 of the insertion hole 15 and thus, durability of the shutter plate 44 is improved with the uniform distribution of elastic force of the shutter plate 44 by the curved portion 52 and even if the shutter plate 44 repeatedly falls and rises, the elastic force of the shutter plate 44 does not deteriorate and the insertion hole 15 can reliably be shielded by using the shutter plate 44 in repeated uses.

Figure 11:
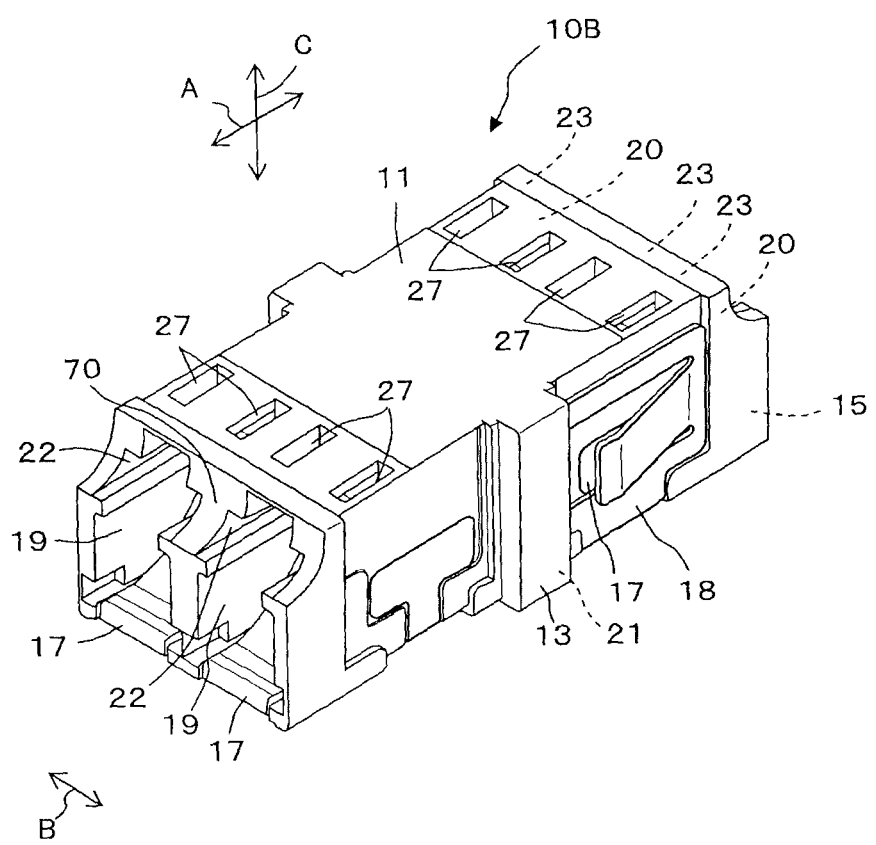
FIG. 11 is a perspective view of the optical connector adapter shown as another example.
Figure 12:
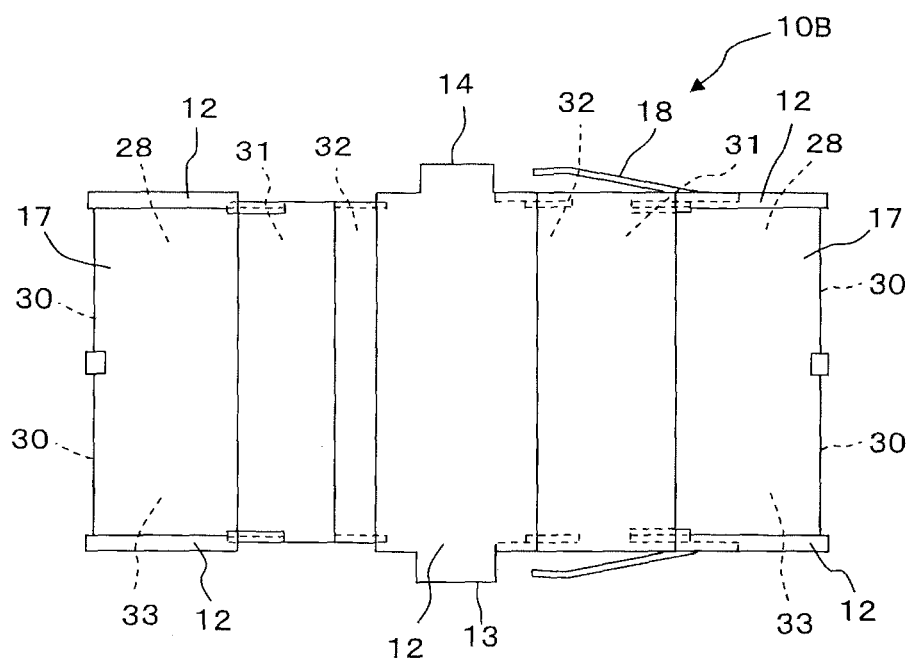
FIG. 12 is a bottom view showing the bottom wall of the adapter in FIG. 11.
Figure 13:
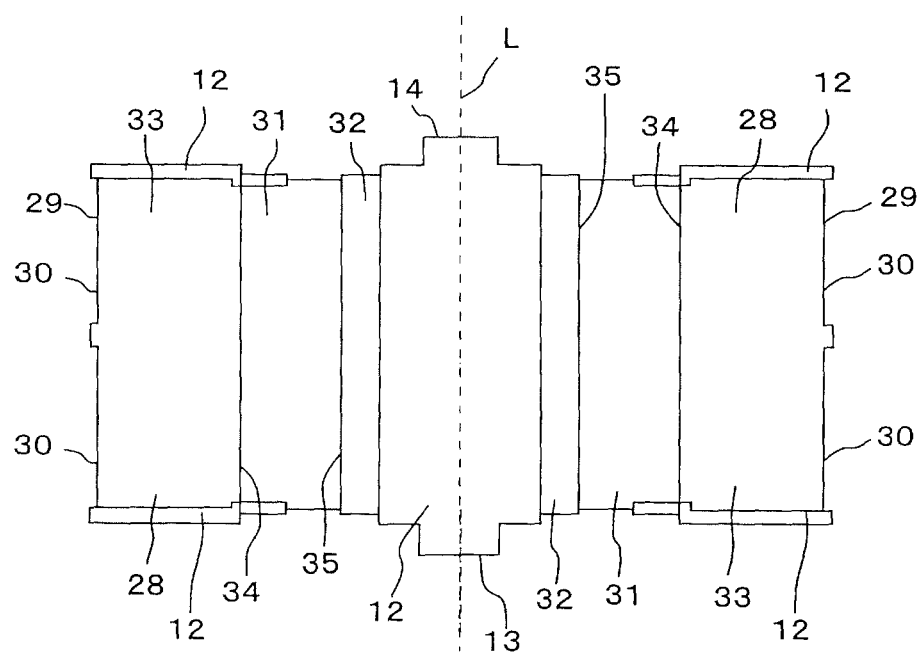
FIG. 13 is a bottom view showing the bottom wall of the adapter in FIG. 11 before the shutter member and the stopper member are mounted.
Figure 14:
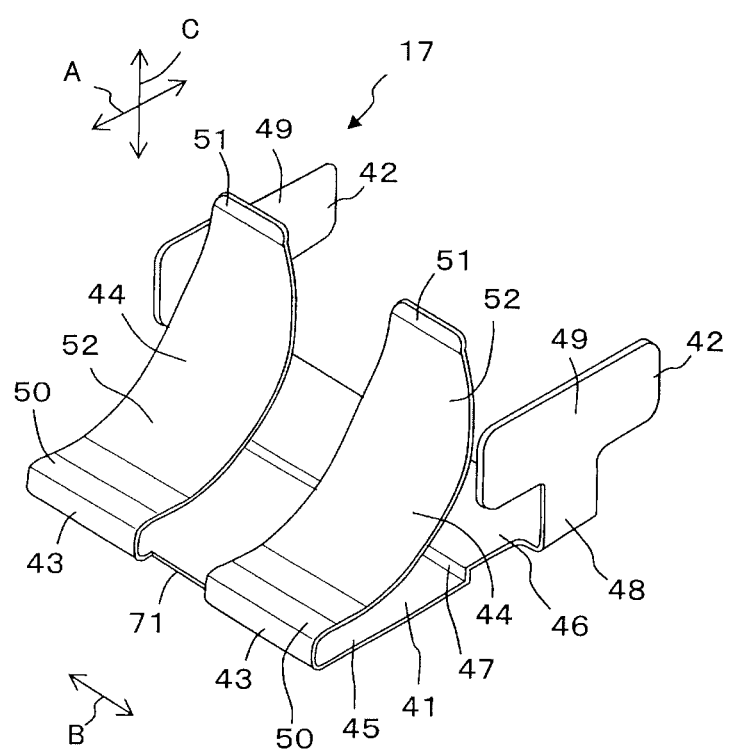
FIG. 14 is a perspective view of the shutter member shown as another example.
Figure 15:
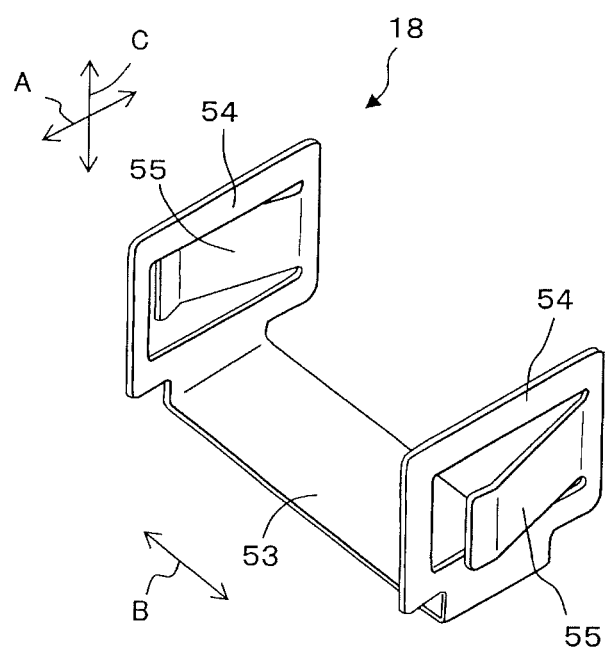
FIG. 15 is a perspective view of the stopper member shown as another example.

FIG. 11 is a perspective view of an optical connector adapter 10B shown as another example and FIG. 12 is a bottom view showing the bottom wall 12 of the adapter 10B in FIG. 11. FIG. 13 is a bottom view showing the bottom wall 12 of the adapter 10B before the shutter member 17 (shielding metal fitting) and the stopper member 18 (locking metal fitting) are mounted and FIG. 14 is a perspective view of the shutter member 17 shown as another example. FIG. 15 is a perspective view of the stopper member 18 shown as another example. In FIGS. 11, 14, and 15, the front-back direction is indicated by the arrow A, the lateral direction by the arrow B, and the up-down direction by the arrow C.

The optical connector adapter 10B is different from the optical connector adapter 10A in FIG. 1 in that the optical connector adapter 10B includes a partition wall 70, two insertion holes 15 arranged in the lateral direction across the partition wall 70, and two connecting plates 43 and two shutter plates 44 arranged in the lateral direction while the shutter member 17 shares the base plate 41. The other configuration of the optical connector adapter 10B is the same as that of the adapter 10A in FIG. 1 and the same reference numerals as those in FIG. 1 are attached and a detailed description of the other configuration of the adapter 10B will not be repeated by quoting the description of the adapter 10A in FIG. 1.

The adapter 10B includes the top/bottom walls 11, 12 and the both sidewalls 13, 14 extending in the front-back direction, the partition wall 70 positioned between the both sidewalls 13, 14 and extending in the front-back direction, the two insertion holes 15 surrounded by these walls 11 to 14 and 70 and cutting through in the front-back direction, the two sleeve holders 57 and the two segment sleeves for optical connection 16 (FIG. 8 quoted) arranged in the center portion 21 of these insertion holes 15, the shutter member 17, and the stopper member 18. The four engaging portions 22, 23 with which the engaging member 61 (FIG. 9 quoted) of the optical connector plug 58 is removably engaged are formed in the both ends 19, 20 of the insertion holes 15 of the adapter 10B.

These engaging portions 22, 23 are formed of the first flange 24 formed in the both sidewalls 13, 14 and the partition wall 70 and extending from the both ends 19, 20 toward the center portion 21 in the front-back direction, the second flange 25 formed at an intersection of the top wall 11 and the both sidewalls 13, 14 and at an intersection of the top wall 11 and the partition wall 70 and extending from the both ends 19, 20 toward the center portion 21 in the front-back direction, the guide groove 26 positioned between these flanges 24, 25 and extending in the front-back direction, and the insertion opening 27 formed in the top wall 11 and into which the insertion protrusion 69 (FIGS. 9, 10 quoted) of the engaging member 61 of the optical connector plug 58 is removably inserted. The second flange 25 is inclined downward in the up-down direction from the both ends 19, 20 toward the center portion 21.

The two bottom wall recesses 28 recessed in the up-down direction toward the internal surface of the bottom wall 12 are formed on the external surface of the bottom wall 12 of the adapter 10B. These bottom wall recesses 28 are formed symmetrically by sandwiching the center line L therebetween. The four end face recesses 30 recessed toward the center portion 21 of the insertion holes 15 are formed on the both end faces 29 of the bottom wall 12 of the adapter 10B. These end face recesses 30 are formed symmetrically by sandwiching the center line L therebetween.

As shown in FIG. 13, the bottom wall recesses 28 are formed of the first bottom wall recess 31 positioned on the side of the both ends 19, 20 of the insertion holes 15, the second bottom wall recess 32 positioned on the side of the center portion 21, the third bottom wall recess 33 positioned on the side of the both end faces 29 from the first bottom wall recess 31, the first bottom wall step portion 34 connected to the first bottom wall recess 31 and the third bottom wall recess 33, and the second bottom wall step portion 35 connected to the first bottom wall recess 31 and the second bottom wall recess 32.

The first bottom wall recesses 31 are formed symmetrically across the center line L. The second bottom wall recesses 32 are formed symmetrically across the center line L. The second bottom wall recess 32 has a recess depth shallower than that of the first bottom wall recess 31 and deeper than that of the third bottom wall recess 33. The third bottom wall recesses 33 are formed symmetrically across the center line L. The third bottom wall recess 33 has a recess depth shallower than that of the second bottom wall recess 32.

In the third bottom wall recess 33, both edges thereof in the lateral direction are positioned on the inner side of the bottom wall 12 and a step height arises between the both edges of the third bottom wall recess 33 in the lateral direction and the bottom wall 12 so that the bottom wall 12 becomes a barrier to the third bottom wall recess 33. A step height arises between the second bottom wall recess 32 and the bottom wall 12 so that the bottom wall 12 becomes a barrier to the second bottom wall recess 32. A step height arises between the first bottom wall recess 31 and the second bottom wall recess 32 so that the second bottom wall recess 32 becomes a barrier to the first bottom wall recess 31 and a step height arises between first bottom wall recess 31 and the third bottom wall recess 33 so that the third bottom wall recess 33 becomes a barrier to the first bottom wall recess 31.

The four accommodation recesses 56 recessed in the up-down direction from the internal surface of the bottom wall 12 toward the external surface thereof are formed on the internal surface of the bottom wall 12 of the adapter 10B (FIG. 8 quoted). These accommodation recesses 56 have a plane shape slightly larger than that of the bent portion 51 and the curved portion 52 of the shutter member 17 and so can accommodate the bent portion 51 and the curved portion 52.

The sidewall recess 36 recessed in the lateral direction from the external surface of the both sidewalls 13, 14 of the adapter 10B toward the internal surface thereof is formed on the external surface of the both sidewalls 13, 14 (FIG. 3 quoted). The sidewall recesses 36 are formed in the same shape on the one sidewall 13 and on the other sidewall 14 and formed symmetrically across the center line L. The sidewall recess 36 is formed of the first sidewall recess 37 positioned on the side of the bottom wall 12 and connected to the second bottom wall recess 32 and the second sidewall recess 38 positioned on the inner side of the first sidewall recess 37 and connected to the first bottom wall recess 31 (FIG. 5 quoted).

The second sidewall recess 38 has a recess depth deeper than that of the first sidewall recess 37. The second sidewall recess 38 includes the narrow portion 39 connected to the first bottom wall recess 31 and whose width dimension in the front-back direction is narrow and the wide portion 40 connected to the narrow portion 39. A step height arises between the first sidewall recess 37 and the both sidewalls 13, 14 and also a step height arises between the first sidewall recess 37 and the second sidewall recess 38.

As shown in FIG. 14, the shutter member 17 is formed of the substantially rectangular base plate 41 (first base plate), the both side plates 42 (first both side plates) extending upward from both side edges of the base plate 41, the two connecting plates 43 positioned between the both side plates 42 and extending upward from the front edge of the base plate 41, and the two shutter plates 44 connected to the connecting plates 43 and extending upward from the base plate 41. The base plate 41 includes the first fitting portion 45 positioned on the front side in the front-back direction, the second fitting portion 46 positioned on the rear side in the front-back direction, the step fitting portion 47 positioned between the first and second fitting portions 45, 46, and a recess 71 positioned between the shutter plates 44 and recessed (on the rear side in the front-back direction) toward the center portion 21 of the insertion holes 15.

The first fitting portion 45 of the base plate 41 has a plane shape substantially the same as the shape of the third bottom wall recess 33 in shape and size and the second fitting portion 46 has a plane shape substantially the same as the shape of the first bottom wall recess 31 in shape and size. The step fitting portion 47 has a plane shape substantially the same as the shape of the first bottom wall step portion 34 in shape and size. The both side plates 42 of the shutter member 17 have a plane shape substantially the same as the shape of the second sidewall recess 38 in shape and size. The both side plates 42 have the narrow portion 48 connected to the base plate 41 and whose width dimension in the front-back direction is narrow and the wide portion 49 connected to the narrow portion 48. The narrow portion 48 has a plane shape substantially the same as that of the narrow portion 39 of the second sidewall recess 38 in shape and size. The wide portion 49 has a plane shape substantially the same as that of the wide portion 40 of the second sidewall recess 38 in shape and size.

These shutter plates 44 are elastically deformable with the side of the connecting plates 43 set as the base end. These shutter plates 44 include the fixed portion 50 positioned at the base end and connected to the connecting plate 43, the bent portion 51 positioned at the extending end thereof and bent at a predetermined angle with respect to the center portion 21 of the insertion hole 15, and the curved portion 52 positioned between the fixed portion 50 and the bent portion 51 to draw an arc so that the arc is convex toward the center portion 21 of the insertion hole 15.

As shown in FIG. 11, the shutter member 17 is removably fixed to the both ends 19, 20 of the insertion hole 15. The procedure for installing the shutter member 17 on the both ends 19, 20 is the same as that for installing the shutter member 17 in FIG. 1. The first fitting portion 45 of the base plate 41 of the shutter member 17 is fitted into the third bottom wall recess 33 and is fitted to and in close contact with the whole third bottom wall recess 33. The second fitting portion 46 of the base plate 41 of the shutter member 17 is fitted into the first bottom wall recess 31 and is fitted to and in close contact with the whole first bottom wall recess 31. The step fitting portion 47 of the base plate 41 of the shutter member 17 is fitted to and in close contact with the first bottom wall step portion 34.

The both side plates 42 of the shutter member 17 are fitted into the second sidewall recess 38 and are fitted to and in close contact with the second sidewall recess 38. The narrow portion 48 of the both side plates 42 is fitted into the narrow portion 39 of the second sidewall recess 38 and is fitted to and in close contact with the whole portion 39 and the wide portion 49 of the both side plates 42 is fitted into the wide portion 40 of the second sidewall recess 38 and is fitted to and in close contact with the portion 40. The connecting plates 43 of the shutter member 17 are fitted to and in close contact with the end face recess 30 of the bottom wall end face 29. The bent portion 51 and the curved portion 52 of the shutter plates 44 of the shutter member 17 are positioned at the both ends 19, 20 of the insertion holes 15 to shield the insertion holes 15. In the shutter member 17, the internal and external surfaces of the bottom wall 12 of the adapter 10B are sandwiched between the first fitting portion 45 of the base plate 41 and the fixed portion 50 of the shutter plate 44.

As shown in FIG. 15, the stopper member 18 is formed of the substantially rectangular base plate 53 (second base plate), the both side plates 54 (second both side plates) extending upward from both side edges of the base plate 53, and the locking plate 55 formed on the both side plates 54 and extending by being tilted to spread out outward in the lateral direction. The base plate 53 of the stopper member 18 has a plane shape substantially the same as a combined shape of the first bottom wall recess 31 and the second bottom wall recess 32 in shape and size. The both side plates 54 of the stopper member 18 have a plane shape substantially the same as a combined shape of the first sidewall recess 37 and the second sidewall recess 38 in shape and size.

The stopper member 18 is removably fixed to the one end 20 of the adapter 10B while being overlaid on the shutter member 17. The procedure for installing the stopper member 18 on the end 20 is the same as that for installing the stopper member 18 in FIG. 1. The base plate 53 of the stopper member 18 is fitted into the second bottom wall recess 32 while being overlaid on the second fitting portion 46 of the base plate 41 of the shutter member 17 and is fitted to and in close contact with the whole second bottom wall recess 32. The both side plates 54 of the stopper member 18 are fitted into the first sidewall recess 37 while being overlaid on the both side plates 42 of the shutter member 17 and is fitted to and in close contact with the whole first sidewall recess 37.

Like the adapter 10A in FIG. 1, the adapter 10B is mounted at predetermined positions of a mounting panel, various apparatuses, and various devices used for optical communication by using the locking plate 55 of the stopper member 18. The procedure for inserting the optical connector plug 58 into the adapter 10B and the procedure for extracting the optical connector plug 58 from the adapter 10B are the same as those for the adapter 10A in FIG. 1. Thus, FIGS. 9 and 10 are quoted and a description thereof will not be repeated by quoting the description of FIGS. 9 and 10. The configuration of the optical connector plug 58 is the same as that illustrated in FIGS. 9 and 10.

The curvature radius of the curved portion 52 of the shutter plate 44 of the shutter member 17 in the adapter 10B is the same as that of the curved portion 52 of the shutter plate 44 of the shutter member 17 of the adapter 10A in FIG. 1. The thickness dimension of the shutter member 17 of the adapter 10B is the same as that of the shutter member 17 of the adapter 10A in FIG. 1 and the elastic/repulsive force of the curved portion 52 of the shutter plate 44 in the adapter 10B is the same as that of the curved portion 52 of the shutter plate 44 in FIG. 1. The measuring method of the elastic/repulsive force of the curved portion 52 of the shutter plate 44 is the same as that of the curved portion 52 of the shutter plate 44 in FIG. 1.

In addition to the effects achieved by the adapter 10A in FIG. 1, the optical connector adapter 10B achieves effects described below. The adapter 10B allows the two optical connector plugs for optical fiber connection 58 arranged in the lateral direction to be inserted through the both ends 19, 20 of the insertion holes 15 so that an optical connection can be established via these optical connector plugs 58 to enable optical connections by a plurality of paths at the same time.

The shutter member 17 of the adapter 10B is formed of the base plate 41, the both side plates 42 extending upward from both side edges of the base plate 41, the two connecting plates 43 extending upward from the front edge of the base plate 41, and the two shutter plate 44 connected to the connecting plates and curved with the predetermined curvature radius. Thus, the number of parts of the shutter member 17 is small and even when the shutter member 17 is produced by press molding, the level of difficulty of processing is low so that the shutter member 17 in the same shape and size can be mass-produced in a short time by press molding. The shutter member 17 and the stopper member 18 can be produced at low production costs and, as a result, the adapter 10B itself can be produced at low unit costs.

The shutter member 17 can easily be mounted on the adapter 10B by fitting the base plate 41 of the shutter member 17 into the bottom wall recesses 28 formed on the external surface of the bottom wall 12 of the adapter 10B and fitting the both side plates 42 of the shutter member 17 into the sidewall recess 36 formed on the external surface of the both sidewalls 13, 14. The stopper member 18 can easily be mounted on the adapter 10B by fitting the base plate 53 of the stopper member 18 into the bottom wall recesses 28 formed on the external surface of the bottom wall 12 of the adapter 10B and fitting the both side plates 54 of the stopper member 18 into the sidewall recess 36 formed on the external surface of the both sidewalls 13, 14 so that the stopper member 18 is overlaid on the shutter member 17. The shutter member 17 and the stopper member 18 can easily be mounted on the adapter 10B and the adapter 10B can be assembled without much expense in time and effort and, as a result, the adapter 10B itself can be produced at low unit costs.

In the adapter 10B, even if one of the shutter plates 44 of the shutter plate 17 should fall against the elastic force thereof owing to the insertion of the optical connector plug 58, the force of falling of the one shutter plate 44 is not transmitted to the other shutter plate 44 arranged in the lateral direction thanks to the recess 71. Therefore, even if one of the shutter plates 44 should fall, the other shutter plate 44 will not fall following the one shutter plate 44 so that the other insertion hole 15 can reliably be shielded by the other shutter plate 44.

Figure 16:
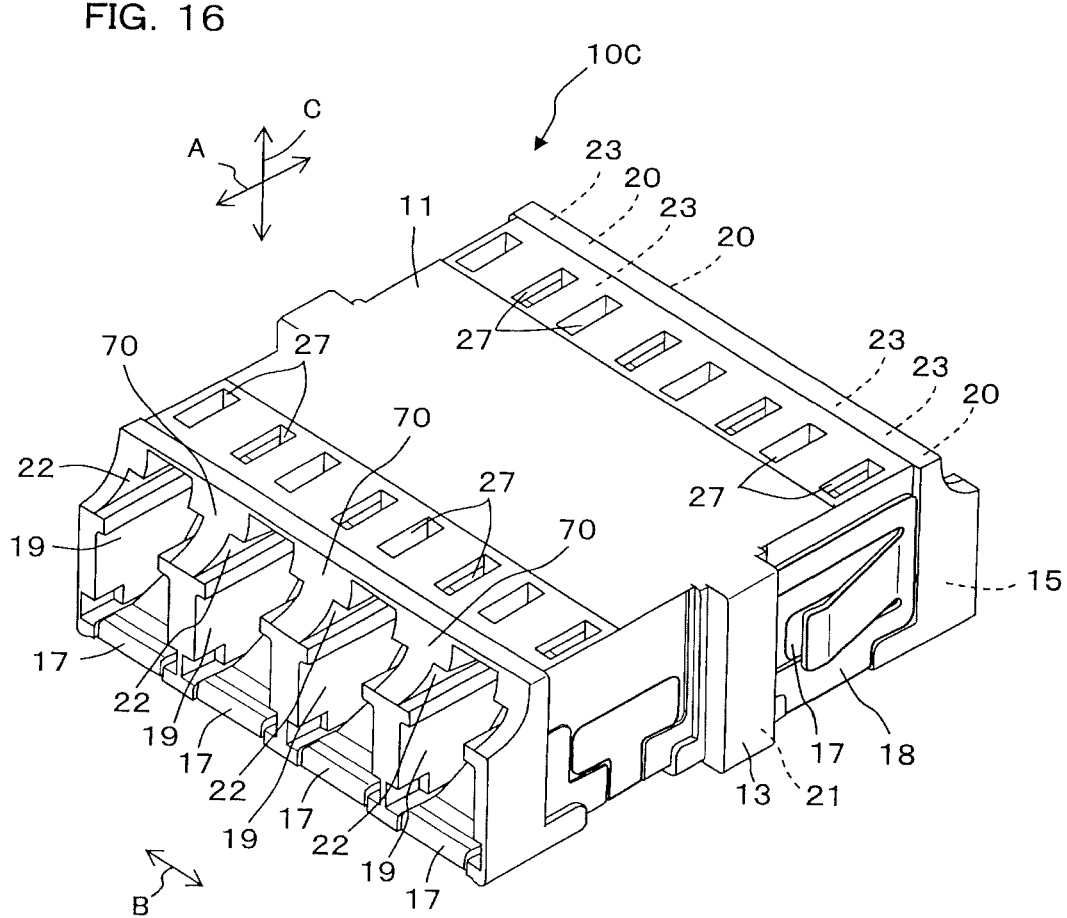
FIG. 16 is a perspective view of the optical connector adapter shown as still another example.
Figure 17:
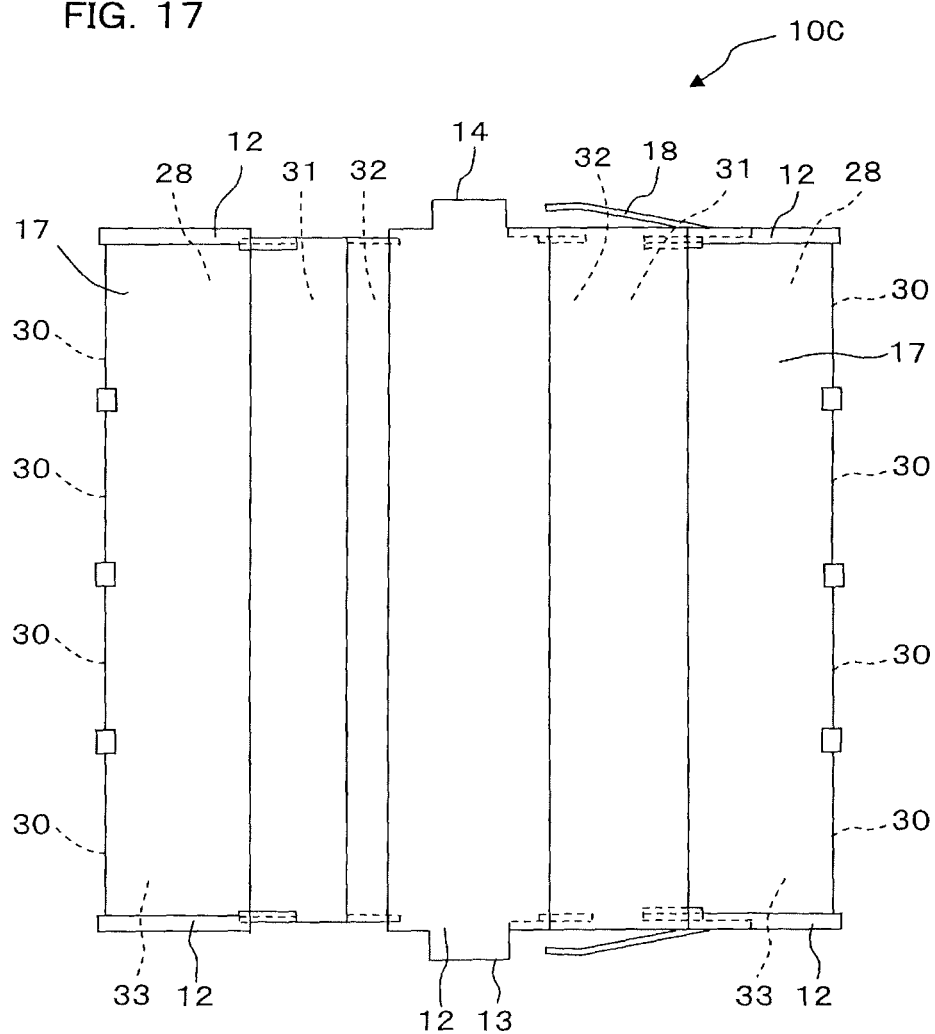
FIG. 17 is a bottom view showing the bottom wall of the adapter in FIG. 16.
Figure 18:
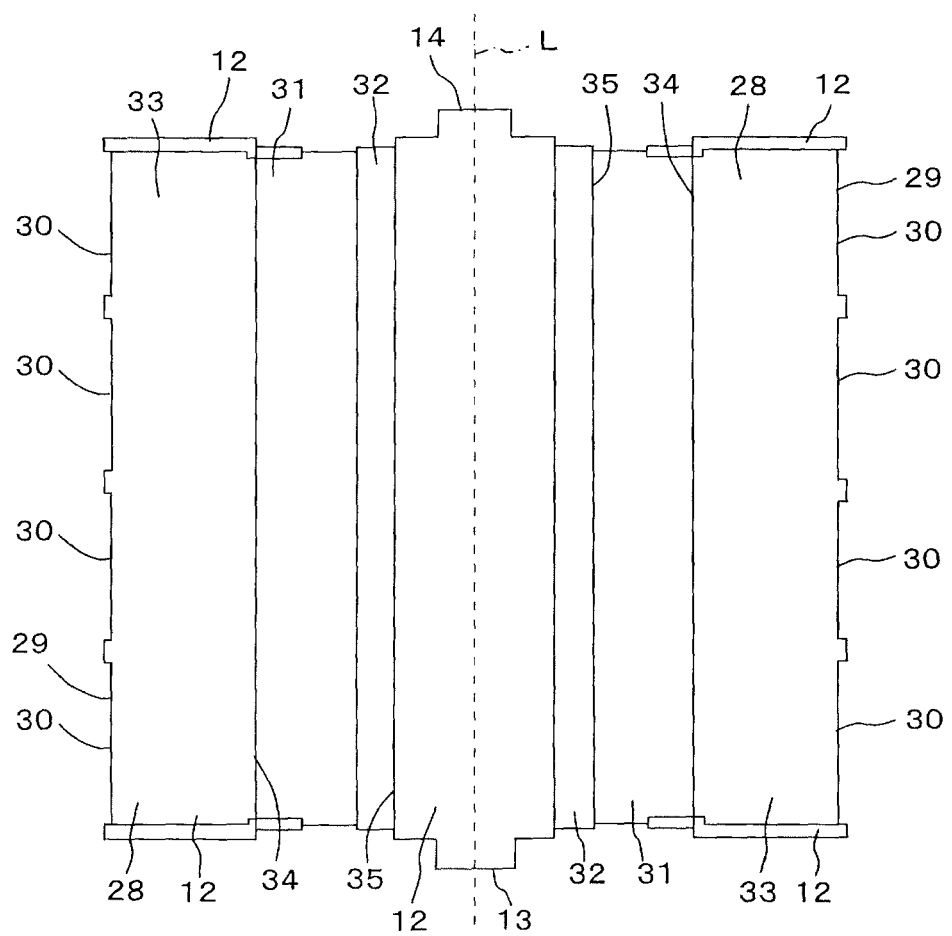
FIG. 18 is a bottom view showing the bottom wall of the adapter in FIG. 16 before the shutter member and the stopper member are mounted.
Figure 19:
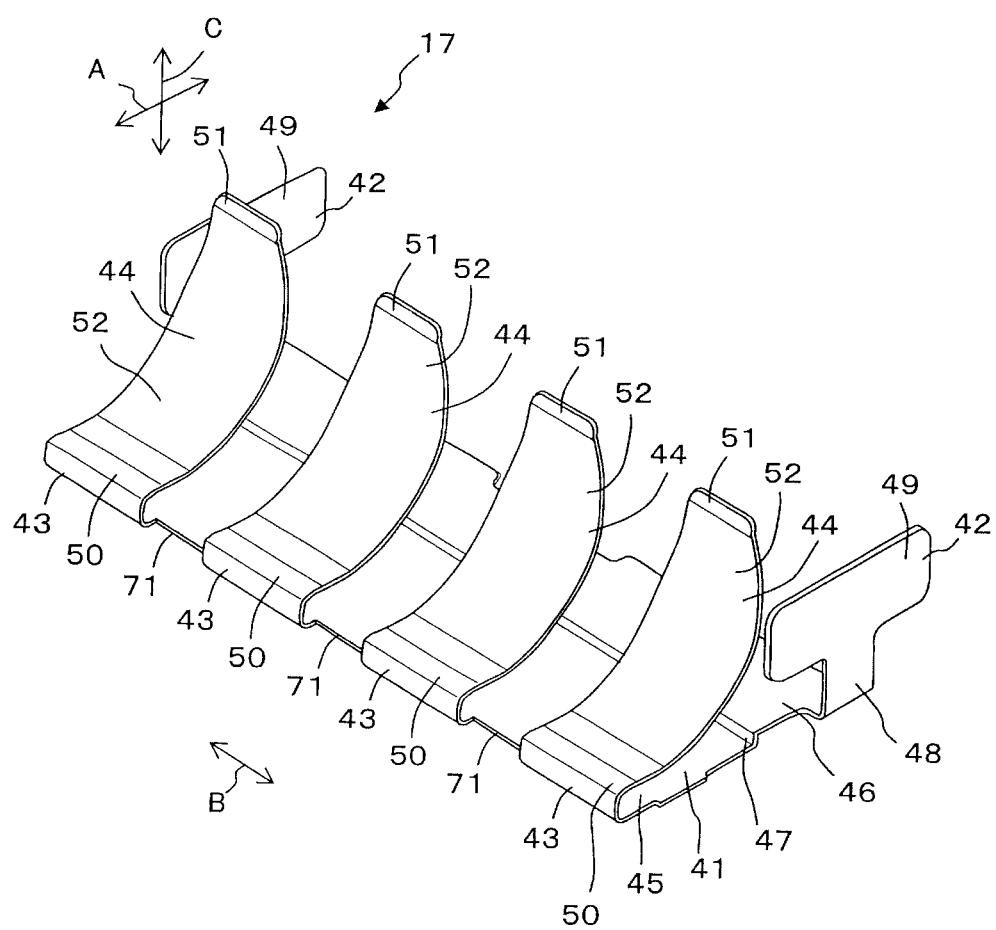
FIG. 19 is a perspective view of the shutter member shown as still another example.
Figure 20:
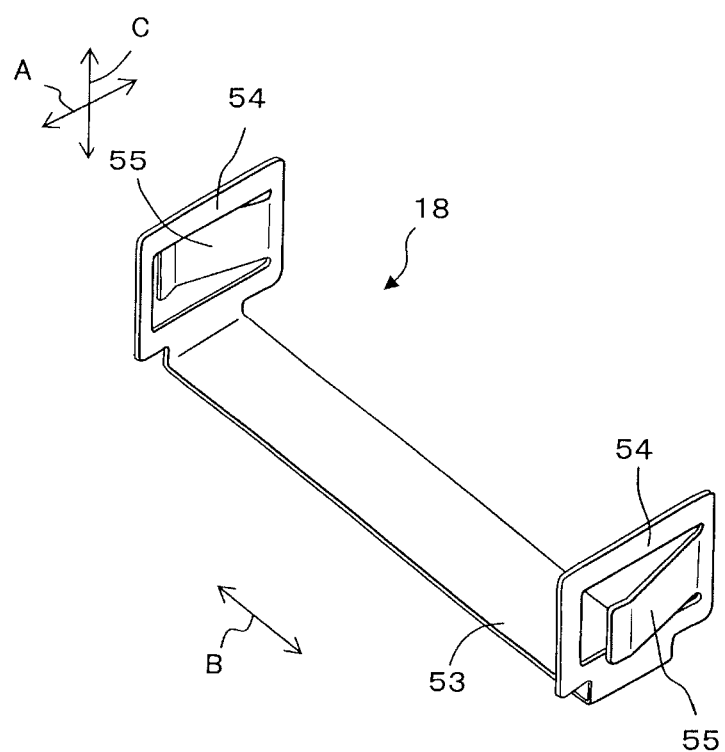
FIG. 20 is a perspective view of the stopper member shown as still another example.

FIG. 16 is a perspective view of an optical connector adapter 10C shown as another example and FIG. 17 is a bottom view showing the bottom wall 12 of the adapter 10C in FIG. 16. FIG. 18 is a bottom view showing the bottom wall 12 of the adapter 10C before the shutter member 17 (shielding metal fitting) and the stopper member 18 (locking metal fitting) are mounted and FIG. 19 is a perspective view of the shutter member 17 shown as another example. FIG. 20 is a perspective view of the stopper member 18 shown as another example. In FIGS. 16, 19, and 20, the front-back direction is indicated by the arrow A, the lateral direction by the arrow B, and the up-down direction by the arrow C.

The optical connector adapter 10C is different from the optical connector adapter 10A in FIG. 1 in that the optical connector adapter 10C includes the partition wall 70, the four insertion holes 15 arranged in the lateral direction across the partition wall 70, and the four connecting plates 43 and the four shutter plates 44 arranged in the lateral direction while the shutter member 17 shares the base plate 41. The other configuration of the optical connector adapter 10C is the same as that of the adapter 10A in FIG. 1 and the same reference numerals as those in FIG. 1 are attached and a detailed description of the other configuration of the adapter 10C will not be repeated by quoting the description of the adapter 10A in FIG. 1.

The adapter 10C includes the top/bottom walls 11, 12 and the both sidewalls 13, 14 extending in the front-back direction, the partition wall 70 positioned between the both sidewalls 13, 14 and extending in the front-back direction, the four insertion holes 15 surrounded by these walls 11 to 14 and 70 and cutting through in the front-back direction, the four sleeve holders 57 and the four segment sleeves for optical connection 16 (FIG. 8 quoted) arranged in the center portion 21 of these insertion holes 15, the shutter member 17, and the stopper member 18. The four engaging portions 22, 23 with which the engaging member 61 (FIG. 9 quoted) of the optical connector plug 58 is removably engaged are formed in the both ends 19, 20 of the insertion holes 15 of the adapter 10C.

These engaging portions 22, 23 are formed of the first flange 24 formed in the both sidewalls 13, 14 and the partition wall 70 and extending from the both ends 19, 20 toward the center portion 21 in the front-back direction, the second flange 25 formed at an intersection of the top wall 11 and the both sidewalls 13, 14 and at an intersection of the top wall 11 and the partition wall 70 and extending from the both ends 19, 20 toward the center portion 21 in the front-back direction, the guide groove 26 positioned between these flanges 24, 25 and extending in the front-back direction, and the insertion opening 27 formed in the top wall 11 and into which the insertion protrusion 69 (FIGS. 9, 10 quoted) of the engaging member 61 of the optical connector plug 58 is removably inserted. The second flange 25 is inclined downward in the up-down direction from the both ends 19, 20 toward the center portion 21.

The four bottom wall recesses 28 recessed in the up-down direction toward the internal surface of the bottom wall 12 are formed on the external surface of the bottom wall 12 of the adapter 10C. These bottom wall recesses 28 are formed symmetrically by sandwiching the center line L therebetween. The eight end face recesses 30 that are recessed toward the center portion 21 of the insertion holes 15 are formed on the both end faces 29 of the bottom wall 12 of the adapter 10C. These end face recesses 30 are formed symmetrically by sandwiching the center line L therebetween.

As shown in FIG. 18, the bottom wall recesses 28 are formed of the first bottom wall recess 31 positioned on the side of the both ends 19, 20 of the insertion holes 15, the second bottom wall recess 32 positioned on the side of the center portion 21, the third bottom wall recess 33 positioned on the side of the both end faces 29 from the first bottom wall recess 31, the first bottom wall step portion 34 connected to the first bottom wall recess 31 and the third bottom wall recess 33, and the second bottom wall step portion 35 connected to the first bottom wall recess 31 and the second bottom wall recess 32.

The first bottom wall recesses 31 are formed symmetrically across the center line L. The second bottom wall recesses 32 are formed symmetrically across the center line L. The second bottom wall recess 32 has a recess depth shallower than that of the first bottom wall recess 31 and deeper than that of the third bottom wall recess 33. The third bottom wall recesses 33 are formed symmetrically across the centerline L. The third bottom wall recess 33 has a recess depth shallower than that of the second bottom wall recess 32.

In the third bottom wall recess 33, both edges thereof in the lateral direction are positioned on the inner side of the bottom wall 12. A step height arises between the both edges of the third bottom wall recess 33 in the lateral direction and the bottom wall 12 so that the bottom wall 12 becomes a barrier to the third bottom wall recess 33. A step height arises between the second bottom wall recess 32 and the bottom wall 12 so that the bottom wall 12 becomes a barrier to the second bottom wall recess 32. A step height arises between first bottom wall recess 31 and the second bottom wall recess 32 so that the second bottom wall recess 32 becomes a barrier to the first bottom wall recess 31 and a step height arises between first bottom wall recess 31 and the third bottom wall recess 33 so that the third bottom wall recess 33 becomes a barrier to the first bottom wall recess 31.

The eight accommodation recesses 56 recessed in the up-down direction from the internal surface of the bottom wall 12 toward the external surface thereof are formed on the internal surface of the bottom wall 12 of the adapter 10C (FIG. 8 quoted). These accommodation recesses 56 have a plane shape slightly larger than that of the bent portion 51 and the curved portion 52 of the shutter member 17 and so can accommodate the bent portion 51 and the curved portion 52.

The sidewall recess 36 recessed in the lateral direction from the external surface of the both sidewalls 13, 14 of the adapter 10C toward the internal surface thereof is formed on the external surface thereof (FIG. 3 quoted). The sidewall recesses 36 are formed in the same shape on the one sidewall 13 and on the other sidewall 14 and formed symmetrically across the center line L. The sidewall recess 36 is formed of the first sidewall recess 37 positioned on the side of the bottom wall 12 and connected to the second bottom wall recess 32 and the second sidewall recess 38 positioned on the inner side of the first sidewall recess 37 and connected to the first bottom wall recess 31 (FIG. 5 quoted).

The second sidewall recess 38 has a recess depth deeper than that of the first sidewall recess 37. The second sidewall recess 38 includes the narrow portion 39 connected to the first bottom wall recess 31 and whose width dimension in the front-back direction is narrow and the wide portion 40 connected to the narrow portion 39. A step height arises between the first sidewall recess 37 and the both sidewalls 13, 14. A step height also arises between the first sidewall recess 37 and the second sidewall recess 38.

As shown in FIG. 19, the shutter member 17 is formed of the substantially rectangular base plate 41 (first base plate), the both side plates 42 (first both side plates) extending upward from both side edges of the base plate 41, the four connecting plates 43 positioned between the both side plates 42 and extending upward from the front edge of the base plate 41, and the four shutter plates 44 connected to the connecting plates 43 and extending upward from the base plate 41. The base plate 41 includes the first fitting portion 45 positioned on the front side in the front-back direction, the second fitting portion 46 positioned on the rear side in the front-back direction, the step fitting portion 47 positioned between the first and second fitting portions 45, 46, and the three recesses 71 positioned between the shutter plates 44 and recessed (on the rear side in the front-back direction) toward the center portion 21 of the insertion holes 15.

The first fitting portion 45 of the base plate 41 has a plane shape substantially the same as the shape of the third bottom wall recess 33 in shape and size and the second fitting portion 46 has a plane shape substantially the same as the shape of the first bottom wall recess 31 in shape and size. The step fitting portion 47 has a plane shape substantially the same as the shape of the first bottom wall step portion 34 in shape and size. The both side plates 42 of the shutter member 17 have a plane shape substantially the same as the shape of the second sidewall recess 38 in shape and size. The both side plates 42 have the narrow portion 48 connected to the base plate 41 and whose width dimension in the front-back direction is narrow and the wide portion 49 connected to the narrow portion 48. The narrow portion 48 has a plane shape substantially the same as that of the narrow portion 39 of the second sidewall recess 38 in shape and size. The wide portion 49 has a plane shape substantially the same as that of the wide portion 40 of the second sidewall recess 38 in shape and size.

These shutter plates 44 are elastically deformable with the side of the connecting plates 43 set as the base end. These shutter plates 44 include the fixed portion 50 positioned at the base end and connected to the connecting plate 43, the bent portion 51 positioned at the extending end thereof and bent at a predetermined angle with respect to the center portion 21 of the insertion hole 15, and the curved portion 52 positioned between the fixed portion 50 and the bent portion 51 to draw an arc so that the arc is convex toward the center portion 21 of the insertion hole 15.

As shown in FIG. 16, the shutter member 17 is removably fixed to the both ends 19, 20 of the insertion hole 15. The procedure for installing the shutter member 17 on the both ends 19, 20 is the same as that for installing the shutter member 17 in FIG. 1. The first fitting portion 45 of the base plate 41 of the shutter member 17 is fitted into the third bottom wall recess 33 and is fitted to and in close contact with the whole third bottom wall recess 33. The second fitting portion 46 of the base plate 41 of the shutter member 17 is fitted into the first bottom wall recess 31 and is fitted to and in close contact with the whole first bottom wall recess 31. The step fitting portion 47 of the base plate 41 of the shutter member 17 is fitted to and in close contact with the first bottom wall step portion 34.

The both side plates 42 of the shutter member 17 are fitted into the second sidewall recess 38 and are fitted to and in close contact with the second sidewall recess 38. The narrow portion 48 of the both side plates 42 is fitted into the narrow portion 39 of the second sidewall recess 38 and is fitted to and in close contact with the whole portion 39. The wide portion 49 of the both side plates 42 is fitted into the wide portion 40 of the second sidewall recess 38 and is fitted to and in close contact with the portion 40. The connecting plates 43 of the shutter member 17 are fitted to and in close contact with the end face recess 30 of the bottom wall end face 29. The bent portion 51 and the curved portion 52 of the shutter plates 44 of the shutter member 17 are positioned at the both ends 19, 20 of the insertion holes 15 to shield the insertion holes 15. In the shutter member 17, the internal and external surfaces of the bottom wall 12 of the adapter 10C are sandwiched between the first fitting portion 45 of the base plate 41 and the fixed portion 50 of the shutter plate 44.

As shown in FIG. 20, the stopper member 18 is formed of the substantially rectangular base plate 53 (second base plate), the both side plates 54 (second both side plates) extending upward from both side edges of the base plate 53, and the locking plate 55 formed on the both side plates 54 and extending by being tilted to spread out outward in the lateral direction. The base plate 53 of the stopper member 18 has a plane shape substantially the same as a combined shape of the first bottom wall recess 31 and the second bottom wall recess 32 in shape and size. The both side plates 54 of the stopper member 18 have a plane shape substantially the same as a combined shape of the first sidewall recess 37 and the second sidewall recess 38 in shape and size.

The stopper member 18 is removably fixed to the one end 20 of the adapter 10C while being overlaid on the shutter member 17. The procedure for installing the stopper member 18 on the end 20 is the same as that for installing the stopper member 18 in FIG. 1. The base plate 53 of the stopper member 18 is fitted into the second bottom wall recess 32 while being overlaid on the second fitting portion 46 of the base plate 41 of the shutter member 17 and is fitted to and in close contact with the whole second bottom wall recess 32. The both side plates 54 of the stopper member 18 are fitted into the first sidewall recess 37 while being overlaid on the both side plates 42 of the shutter member 17 and is fitted to and in close contact with the whole first sidewall recess 37.

Like the adapter 10A in FIG. 1, the adapter 10C is mounted at predetermined positions of a mounting panel, various apparatuses, and various devices used for optical communication by using the locking plate 55 of the stopper member 18. The procedure for inserting the optical connector plug 58 into the adapter 10C and the procedure for extracting the optical connector plug 58 from the adapter 10C are the same as those for the adapter 10A in FIG. 1. Thus, FIGS. 9 and 10 are quoted and a description thereof will not be repeated by quoting the description of FIGS. 9 and 10. The configuration of the optical connector plug 58 is the same as that illustrated in FIGS. 9 and 10.

The curvature radius of the curved portion 52 of the shutter plate 44 of the shutter member 17 in the adapter 10C is the same as that of the curved portion 52 of the shutter plate 44 of the shutter member 17 in the adapter 10A in FIG. 1. The thickness dimension of the shutter member 17 of the adapter 10C is the same as that of the shutter member 17 of the adapter 10A in FIG. 1 and the elastic/repulsive force of the curved portion 52 of the shutter plate 44 in the adapter 10C is the same as that of the curved portion 52 of the shutter plate 44 in FIG. 1. The measuring method of the elastic/repulsive force of the curved portion 52 of the shutter plate 44 is the same as that of the curved portion 52 of the shutter plate 44 in FIG. 1.

In addition to the effects achieved by the adapter 10A in FIG. 1, the optical connector adapter 10C achieves effects described below. The adapter 10C allows the four optical connector plugs for optical fiber connection 58 arranged side by side to be inserted through the both ends 19, 20 of the insertion holes 15 so that optical communication can be connected via these optical connector plugs 58 to enable optical connections by a plurality of paths at the same time.

The shutter member 17 of the adapter C is formed of the base plate 41, the both side plates 42 extending upward from both side edges of the base plate 41, the four connecting plates 43 extending upward from the front edge of the base plate 41, and the four shutter plate 44 connected to the connecting plates and curved with the predetermined curvature radius. Thus, the number of parts of the shutter member 17 is small and when the shutter member 17 is produced by press molding, the level of difficulty of processing is low so that the shutter member 17 in the same shape and size can be mass-produced in a short time by press molding. The shutter member 17 and the stopper member 18 can be produced at low production costs and, as a result, the adapter 10C itself can be produced at low unit costs.

The shutter member 17 can easily be mounted on the adapter 10C by fitting the base plate 41 of the shutter member 17 into the bottom wall recesses 28 formed on the external surface of the bottom wall 12 of the adapter 10C and fitting the both side plates 42 of the shutter member 17 into the sidewall recess 36 formed on the external surface of the both sidewalls 13, 14. The stopper member 18 can easily be mounted on the adapter 10C by fitting the base plate 53 of the stopper member 18 into the bottom wall recesses 28 formed on the external surface of the bottom wall 12 of the adapter 10C and fitting the both side plates 54 of the stopper member 18 into the sidewall recess 36 formed on the external surface of the both sidewalls 13, 14 so that the stopper member 18 is overlaid on the shutter member 17. The shutter member 17 and the stopper member 18 can easily be mounted on the adapter 10C and the adapter 10C can be assembled without much expense in time and effort and, as a result, the adapter 10C itself can be produced at low unit costs.

In the adapter 10C, even if one of the shutter plates 44 of the shutter plate 17 should fall against the elastic force thereof owing to the insertion of the optical connector plug 58, the force of falling of the one shutter plate 44 is not transmitted to the other shutter plates 44 arranged in the lateral direction thanks to the recess 71. Therefore, even if one of the shutter plates 44 should fall, the other shutter plates 44 will not fall following the one shutter plate 44 so that the other insertion holes 15 can reliably be shielded by the other shutter plates 44.

In the adapter 10B in FIG. 11 and the adapter 10C in FIG. 16, the one partition wall 70 or the three partition walls 70 are installed and the two insertion holes 15 or the four insertion holes 15 are arranged in the lateral direction, but the number of the partition walls 70 is not specifically limited and the two or more partition walls 70 or the or more four partition walls 70 may be installed or the three or more insertion holes 15 or the five or more insertion holes 15 may be arranged in the lateral direction. In such a case, the three or more connecting plates 43 and shutter plates 44 or the five or more connecting plates 43 and shutter plates 44 are formed in the shutter member 17 in accordance with the number of insertion holes. In the adapters 10A, 10B, and 10C in FIGS. 1, 11, and 16 respectively, the stopper member 18 is installed on the one end 20, but the stopper member 18 may be installed on the other end 19 only or on the both ends 19, 20.

DESCRIPTION OF REFERENCE NUMERALS

| | |
|---|---|
| 10A | Optical connector adapter |
| 10B | Optical connector adapter |
| 10C | Optical connector adapter |
| 11 | Top wall |
| 12 | Bottom wall |
| 13 | Sidewall |
| 14 | Sidewall |
| 15 | Insertion hole |
| 16 | Sleeve for optical connection |
| 17 | Shutter member |
| 18 | Stopper member |
| 19 | End |
| 20 | End |
| 21 | Center portion |
| 28 | Bottom wall recess |
| 29 | Both end faces |
| 30 | End face recess |
| 31 | First bottom wall recess |
| 32 | Second bottom wall recess |
| 33 | Third bottom wall recess |
| 34 | First bottom wall step portion |
| 35 | second bottom wall step portion |
| 36 | Sidewall recess |
| 37 | First sidewall recess |
| 38 | Second sidewall recess |
| 41 | Base plate (first base plate) |
| 42 | Both side plates (first both side plates) |
| 43 | Connecting plate |
| 44 | Shutter plate |
| 45 | First fitting portion |
| 46 | Second fitting portion |
| 47 | Step fitting portion |
| 50 | Fixed portion |
| 51 | Bent portion |
| 52 | Curved portion |
| 53 | Base plate (second base plate) |
| 54 | Both side plates (second both side plates) |
| 55 | Locking plate |
| 70 | Partition wall |
| 71 | Recess |
| L | Center line |

What is claimed is:

1. An optical connector adapter with a shutter having:

top and bottom walls and sidewalls and an insertion hole surrounded by the top and bottom walls and the side walls, the insertion hole cutting through in the front-back direction to allow an optical connector plug to be attachably and detachably inserted, a shutter member removably installed at both ends of the insertion hole and capable of opening or closing both ends of the insertion hole, and a sleeve installed in a center portion of the insertion hole to support a ferrule of the optical connector plug, wherein the adapter contains a stopper member removably installed at least at one of the both ends of the insertion hole, the shutter member includes a first base plate, first side plates extending upward from both side edges of the first base plate, a connecting plate positioned between the first side plates and extending upward from a front edge of the first base plate, and an elastically deformable shutter plate connected to the connecting plate at the end of the insertion hole and curved with a predetermined curvature radius, the stopper member includes a second base plate, second side plates extending upward from both side edges of the second base plate, and an elastically deformable locking plate formed on the second side plates, a first bottom wall recess recessed from an external surface of the bottom wall toward an internal surface thereof and a second bottom wall recess positioned on a side of the center portion from the first bottom wall recess, recessed from the external surface toward the internal surface, and having a recess depth shallower than the recess depth of the first bottom wall recess are formed on the external surface of the bottom wall extending to both ends of the insertion hole, a first sidewall recess recessed from the external surface toward the internal surface and a second sidewall recess recessed from the external surface toward the internal surface and having the recess depth shallower than the recess depth of the first sidewall recess are formed on the external surface of the both sidewalls extending to both ends of the insertion hole, the first base plate of the shutter member forms a plane substantially the same as a plane of the second bottom wall recess while being fitted into the first bottom wall recess, the second base plate of the stopper member is fitted into the second bottom wall recess while being overlaid on the first base plate, the first side plates of the shutter member form a plane substantially the same as the plane of the second sidewall recess while being fitted into the first sidewall recess, the second side plates of the stopper member are fitted into the second sidewall recess while being overlaid on the first both side plates, and the shutter plate of the shutter member is positioned at the both ends of the insertion hole, and the shutter plate closes the end of the insertion hole, extending upward from the connecting plate, when the optical connector plug is not inserted into the insertion hole, and the shutter plate opens the end of the insertion hole, falling toward the center portion of the insertion hole by being pressed by the optical connector plug, when the optical connector plug is inserted into the insertion hole.

2. The optical connector adapter with a shutter according to claim 1, wherein an end face recess recessed toward the center portion of the insertion hole is formed on an end face of the bottom wall extending to the both ends and the connecting plate of the shutter member is fitted into the end face recess.

3. The optical connector adapter with a shutter according to claim 2, wherein the first base plate of the shutter member is in close contact with the first bottom wall recess, the first both side plates of the shutter member are in close contact with the first sidewall recess, the second base plate of the stopper member is in close contact with the second bottom wall recess and the first base plate of the shutter member, and the second both side plates of the stopper member are in close contact with the second sidewall recess and the first both side plates of the shutter member.

4. The optical connector adapter with a shutter according to claim 3, wherein a third bottom wall recess positioned on a side of each end of the first bottom wall recesses, recessed from the external surface toward the internal surface, and having the recess depth shallower than the recess depth of the second bottom wall recess and a bottom wall step portion connected to the first bottom wall recess and the third bottom wall recess are formed on the external surface of the bottom wall extending to the both ends and the first base plate of the shutter member includes a first fitting portion fitted into the first bottom wall recess, a second fitting portion fitted into the third bottom wall recess, and a step fitting portion positioned between the first fitting portion and the second fitting portion to fit into the bottom wall step portion.

5. The optical connector adapter with a shutter according to claim 4, wherein an accommodation recess that is recessed from the internal surface toward the external surface and accommodates the shutter plate of the shutter member when the shutter plate falls toward the center portion of the insertion hole is formed on the internal surface of the bottom wall extending to both ends of the insertion hole.

6. The optical connector adapter with a shutter according to claim 5, wherein the shutter plate of the shutter member includes a fixed portion positioned at a base end thereof and in close contact with the internal surface of the bottom wall, a bent portion positioned at an extending end of the shutter plate and bent at a predetermined angle with respect to the center portion of the insertion hole, and a curved portion positioned between the fixed portion and the bent portion and curved to form a convex shape toward the center portion of the insertion hole.

7. The optical connector adapter with a shutter according to claim 6, wherein the first bottom wall recess is symmetrically formed, the second bottom wall recess is symmetrically formed, the third bottom wall recess is symmetrically formed, the first sidewall recess is symmetrically formed, and the second sidewall recess is symmetrically formed by each sandwiching a center line dividing the adapter in the front-back direction therebetween.

8. The optical connector adapter with a shutter according to claim 7, wherein the shutter plate has the curvature radius in a range of 5.0 to 7.5 mm.

9. The optical connector adapter with a shutter according to claim 8, wherein the shutter member has a thickness dimension in a range of 0.01 to 0.1 mm and the shutter plate has an elastic/repulsive force in a range of 0.1 to 0.6 N.

10. The optical connector adapter with a shutter according to claim 7, wherein the adapter contains at least one partition wall positioned between both sidewalls and extending in the front-back direction and includes at least two insertion holes arranged in a direction along with the partition wall, the shutter member including at least the two connecting plates and the two shutter plates arranged in the lateral direction while sharing the base plate, and the two shutter plates are positioned at both ends of the two insertion holes and curved to form the convex shape toward the center portion of the insertion holes.

11. The optical connector adapter with a shutter according to claim 10, wherein the base plate of the shutter member includes a recess positioned between the two shutter plates and recessed toward the center portion of the insertion hole.

12. The optical connector adapter with a shutter according to claim 11, wherein the shutter plate has the curvature radius in a range of 5.0 to 7.5 mm.

13. The optical connector adapter with a shutter according to claim 12, wherein the shutter member has a thickness dimension in a range of 0.01 to 0.1 mm and the shutter plate has an elastic/repulsive force in a range of 0.1 to 0.6 N.

14. The optical connector adapter with a shutter according to claim 1, wherein an accommodation recess that is recessed from the internal surface toward the external surface and accommodates the shutter plate of the shutter member when the shutter plate falls toward the center portion of the insertion hole is formed on the internal surface of the bottom wall extending to both ends of the insertion hole.

15. The optical connector adapter with a shutter according to claim 14, wherein the shutter plate of the shutter member includes a fixed portion positioned at a base end thereof and is in close contact with the internal surface of the bottom wall, a bent portion positioned at an extending end of the shutter plate and bent at a predetermined angle with respect to the center portion of the insertion hole, and a curved portion positioned between the fixed portion and the bent portion and curved to form a convex shape toward the center portion of the insertion hole.

16. The optical connector adapter with a shutter according to claim 15, wherein the first bottom wall recess is symmetrically formed, the second bottom wall recess is symmetrically formed, the third bottom wall recess is symmetrically formed, the first sidewall recess is symmetrically formed, and the second sidewall recess is symmetrically formed by each sandwiching a center line dividing the adapter in the front-back direction therebetween.

17. The optical connector adapter with a shutter according to claim 16, wherein the adapter contains at least one partition wall positioned between the sidewalls and extending in the front-back direction and includes at least two insertion holes arranged in the direction along with the partition wall, the shutter member includes at least two connecting plates and the two shutter plates arranged in the lateral direction while sharing the base plate, and the two shutter plates are positioned at the both ends of the two insertion holes and curved to form the convex shape toward the center portion of the insertion holes.

18. The optical connector adapter with a shutter according to claim 17, wherein the base plate of the shutter member includes a recess positioned between the two shutter plates and recessed toward the center portion of the insertion hole.

19. The optical connector adapter with a shutter according to claim 18, wherein the shutter plate has the curvature radius in a range of 5.0 to 7.5 mm.

20. The optical connector adapter with a shutter according to claim 19, wherein the shutter member has a thickness dimension in a range of 0.01 to 0.1 mm and the shutter plate has an elastic/repulsive force in a range of 0.1 to 0.6 N.

* * * * *